(12) United States Patent
Fink

(10) Patent No.: US 10,356,179 B2
(45) Date of Patent: Jul. 16, 2019

(54) METHOD AND APPARATUS FOR SWITCHING BETWEEN SENSORS

(71) Applicant: Ryan Fink, Portland, OR (US)

(72) Inventor: Ryan Fink, Portland, OR (US)

(73) Assignee: Atheer, Inc., Mountain View, CA (US)

( * ) Notice: Subject to any disclaimer, the term of this patent is extended or adjusted under 35 U.S.C. 154(b) by 254 days.

(21) Appl. No.: 15/253,435

(22) Filed: Aug. 31, 2016

(65) Prior Publication Data

US 2017/0063998 A1 Mar. 2, 2017

Related U.S. Application Data

(60) Provisional application No. 62/212,100, filed on Aug. 31, 2015.

(51) Int. Cl.
*G06F 15/16* (2006.01)
*H04L 29/08* (2006.01)
*H04L 29/06* (2006.01)

(52) U.S. Cl.
CPC ............ *H04L 67/12* (2013.01); *H04L 65/607* (2013.01); *H04L 65/80* (2013.01)

(58) Field of Classification Search
CPC ........ H04L 67/12; H04L 65/607; H04L 65/80
USPC ......................................................... 709/217
See application file for complete search history.

(56) References Cited

U.S. PATENT DOCUMENTS

| 2012/0068848 A1* | 3/2012 | Campbell | A61B 5/0008 340/573.1 |
|---|---|---|---|
| 2014/0160030 A1* | 6/2014 | Wright | G06F 3/0489 345/173 |
| 2014/0172310 A1* | 6/2014 | Chin | G06F 19/00 702/19 |
| 2017/0091550 A1* | 3/2017 | Feng | G06K 9/00617 |

* cited by examiner

*Primary Examiner* — Wing F Chan
*Assistant Examiner* — Joseph R Maniwang
(74) *Attorney, Agent, or Firm* — Mohr Intellectual Property Law Solutions, PC

(57) ABSTRACT

Switching among sensor feeds for optimum performance includes disposing a processor in communication with sensors, each said sensor providing a primary data stream. A data stream standard is established in the processor. The primary data streams are communicated from the sensors to the processor, and are compared against the data stream in the processor. A secondary data stream is selected from among the primary data streams or synthesized from one or more of the primary data streams, based on which primary data stream(s) most closely match the data stream standard. The secondary data stream is communicated to a data stream recipient. The data stream recipient may identify input in the secondary data stream, and an input executor may execute control commands corresponding to the input so as to control a device or system.

22 Claims, 16 Drawing Sheets

METHOD AND APPARATUS FOR SWITCHING BETWEEN SENSORS

CROSS-REFERENCE TO RELATED APPLICATIONS

This application claims the benefit of U.S. Provisional Application Ser. No. 62/212,100 filed on Aug. 31, 2015, the contents of which are incorporated by reference for all intents and purposes.

FIELD OF THE INVENTION

The present disclosure relates generally to optimizing sensor data. In particular, methods for dynamically analyzing and switching between data streams from a plurality of sensors to achieve optimal performance in a target application are described.

DESCRIPTION OF RELATED ART

Most computer technology devices today are equipped with multiple visual sensors. Such sensors can include CMOS and CCD devices that are sensitive to visual light (e.g. RGB), thermal, infrared, or ultraviolet, and may be capable of depth sensing or range finding. These array of sensors are useful for a variety of purposes, such as gesture recognition or 3D visualization and/or mapping. However, each type of sensor has particular limitations. For example, IR sensors may wash out easily in bright light, while RGB sensors can, depending on size and quality, have difficulty providing a clean image in low light conditions. The ability of a device to provide particular functionality can be dependent upon the sensors used.

Known methods of providing sensor data to applications may not be entirely satisfactory for the range of applications in which they are employed. For example, existing systems typically utilize a single sensor, and limit optimization of the data to techniques such as gain boosting and/or noise reduction. Such singular approaches may remain limited by the fundamentals of the sensor technology employed.

Alternately, the use of multiple sensors to accomplish the same task may impose high demands for resources on a given system. For example, while in principle it may be possible to fully process both an RGB data stream and a near infrared (NIR) data stream in parallel for some task such as gesture detection, the computational loads, power consumption, heat dissipation, etc. associated with processing two data streams end-to-end may be undesirable for at least certain applications.

BRIEF SUMMARY OF THE INVENTION

The embodiments are directed to a variety of systems, apparatuses, methods, and paradigms for sensor switching.

In one embodiment of the present invention, a machine implemented method is provided that includes disposing a processor in communication with sensors, each sensor being adapted to provide a primary data stream. The method includes instantiating a sensor controller and an operating system on the processor. The method also includes instantiating a data stream analyzer on the processor, the data stream analyzer including a data stream standard. The method further includes instantiating an input detector, an input executor, and a data stream standard on the processor. The method includes communicating the primary data streams from the sensors to the sensor controller, communicating the primary data streams from the sensor controller to the operating system, and communicating the primary data streams from the operating system to the data stream analyzer. The method also includes comparing the primary data streams against the data stream standard with the data stream analyzer, selecting with the data stream analyzer a secondary data stream most closely matching the data stream standard from among the primary data streams, and communicating the secondary data stream from the data stream analyzer to the input detector. The method further includes detecting with the input detector an input in the secondary data stream, communicating the input from the input detector to the input executor, and executing a control command with the input executor corresponding with the input. The method also includes iterating: communicating the primary data streams from the sensors to the sensor controller to the operating system to the data stream analyzer, comparing the primary data streams against the data stream standard, selecting the secondary data stream, communicating the secondary data stream from the data stream analyzer to the input detector, detecting the input in the secondary data stream, communicating the input from the input detector to the input executor, and executing with the input executor the control command corresponding with the input, wherein a primary data stream selected as the secondary data stream in a first iteration differs from a primary data stream selected as the secondary data stream in a second iteration.

In another embodiment of the present invention, a machine implemented method is provided that includes disposing a processor in communication with sensors, each sensor being adapted to provide a primary data stream, and disposing the processor in communication with at least one data stream recipient. The method includes establishing in the processor a data stream standard, communicating the primary data streams from the sensors to the processor, comparing the primary data streams against the data stream standard with the processor, and selecting with the processor a secondary data stream most closely matching the data stream standard from among the primary data streams. The method further includes communicating the secondary data stream from the processor to the data stream recipient.

The method may include iterating comparing the primary data streams against the data stream standard with the processor, and iterating selecting with the processor the secondary data stream most closely matching the data stream standard from among the primary data streams, wherein a primary data stream selected as the secondary data stream in a first iteration differs from a primary data stream selected as the secondary data stream in a second iteration.

The data stream standard may be specific to the data stream recipient. The data stream standard may be specific to a task for the data stream recipient.

The data stream standard may include an environment factor. The environment factor may include a minimum light level, a maximum light level, a maximum infrared light level, and/or a maximum ultraviolet light level.

The data stream standard may include a content factor. The content factor may include a minimum dynamic range, a maximum noise, a minimum input level, and/or a maximum input level.

The data stream standard may include a function factor. The function factor may include input detection, input confidence, input step detection, and/or input step confidence.

The sensors may include an RGB image sensor, a grayscale image sensor, a NIR image sensor, a TIR image sensor, a NIR time-of-flight depth sensor, an RGB stereo sensor, a grayscale stereo sensor, a NIR stereo sensor, and/or an ultrasonic depth sensor.

Comparing the primary data streams may include assigning a quality value to each of the primary data streams with respect to the data stream standard, and selecting the secondary data stream includes selecting one of the primary data streams exhibiting a best quality value. The quality value may be at least two dimensional.

In another embodiment of the present invention, a machine implemented method is provided that includes disposing a processor in communication with sensors, each sensor being adapted to provide a primary data stream, and disposing the processor in communication with at least one data stream recipient. The method includes establishing in the processor a data stream standard, communicating the primary data streams from the sensors to the processor, comparing the primary data streams against the data stream standard with the processor, and synthesizing with the processor a secondary data stream more closely matching the data stream standard than the primary data stream from at least one of the primary data streams. The method further includes communicating the secondary data stream from the processor to the data stream recipient.

In another embodiment of the present invention, an apparatus is provided that includes a processor and sensors in communication with the processor, each sensor being adapted to provide a primary data stream. The apparatus includes a sensor controller instantiated on the processor and adapted to control the sensors and adapted to receive the primary data streams therefrom, an operating system instantiated on the processor and adapted to receive the primary data streams from the sensor controller, and a data stream analyzer instantiated on the processor and adapted to receive the primary data streams from the operating system, the data stream analyzer including a data stream standard and being further adapted to compare the primary data streams against the data stream standard and to select a secondary data stream most closely matching the data stream standard from among the primary data streams. The apparatus also includes an input detector instantiated on the processor and adapted to receive the secondary data stream from the data stream analyzer and to identify an input in the secondary data stream, and an input executor instantiated on the processor and adapted to receive the input from the input detector and to execute a control command corresponding with the input.

In another embodiment of the present invention, an apparatus is provided that includes a processor and sensors in communication with the processor, each the sensor being adapted to provide a primary data stream. The apparatus includes a data stream analyzer instantiated on the processor and adapted to receive the primary data streams from the sensors, the data stream analyzer including a data stream standard and being further adapted to compare the primary data streams against the data stream standard and to select a secondary data stream most closely matching the data stream standard from among the primary data streams. The apparatus further includes a data stream recipient in communication with the processor and adapted to receive the secondary data stream from the data stream analyzer.

The data stream standard may include an environment factor, a content factor, and/or a function factor.

The sensors may include an RGB image sensor, a grayscale image sensor, a NIR image sensor, a TIR image sensor, a NIR time-of-flight depth sensor, an RGB stereo sensor, a grayscale stereo sensor, a NIR stereo sensor, and/or an ultrasonic depth sensor.

The data stream recipient may include a gesture input detector adapted to identify an input in the secondary data stream.

The apparatus may include an input executor adapted to receive the input from the gesture input detector and to execute a control command corresponding with the input.

In another embodiment of the present invention, an apparatus is provided that includes a processor and sensors in communication with the processor, each the sensor being adapted to provide a primary data stream. The apparatus includes a data stream analyzer instantiated on the processor and adapted to receive the primary data streams from the sensors, the data stream analyzer including a data stream standard and being further adapted to compare the primary data streams against the data stream standard and to synthesize a secondary data stream more closely matching the data stream standard than the primary data streams from at least one of the primary data streams. The apparatus further includes a data stream recipient in communication with the processor and adapted to receive the secondary data stream from the data stream analyzer.

In another embodiment of the present invention, an apparatus is provided that includes means for disposing a processor in communication with a plurality of sensors, each the sensor being adapted to provide a primary data stream, means for disposing the processor in communication with at least one data stream recipient, and means for establishing in the processor a data stream standard. The apparatus includes means for communicating the primary data streams from the sensors to the processor, means for comparing the primary data streams against the data stream standard with the processor, and means for selecting with the processor a secondary data stream most closely matching the data stream standard from among the primary data streams. The apparatus further includes means for communicating the secondary data stream from the processor to the data stream recipient.

BRIEF DESCRIPTION OF THE SEVERAL VIEWS OF THE DRAWINGS

Like reference numbers generally indicate corresponding elements in the figures.

DETAILED DESCRIPTION OF THE INVENTION

The disclosed methods and apparatuses for switching between sensors for optimal performance will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, a variety of methods and apparatuses for switching between sensors for optimal performance examples are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Various disclosed examples may be implemented using electronic circuitry configured to perform one or more functions. For example, with some embodiments of the invention, the disclosed examples may be implemented using one or more application-specific integrated circuits (ASICs). More typically, however, components of various examples of the invention will be implemented using a programmable computing device executing firmware or software instructions, or by some combination of purpose-specific electronic circuitry and firmware or software instructions executing on a programmable computing device.

Figure 1:
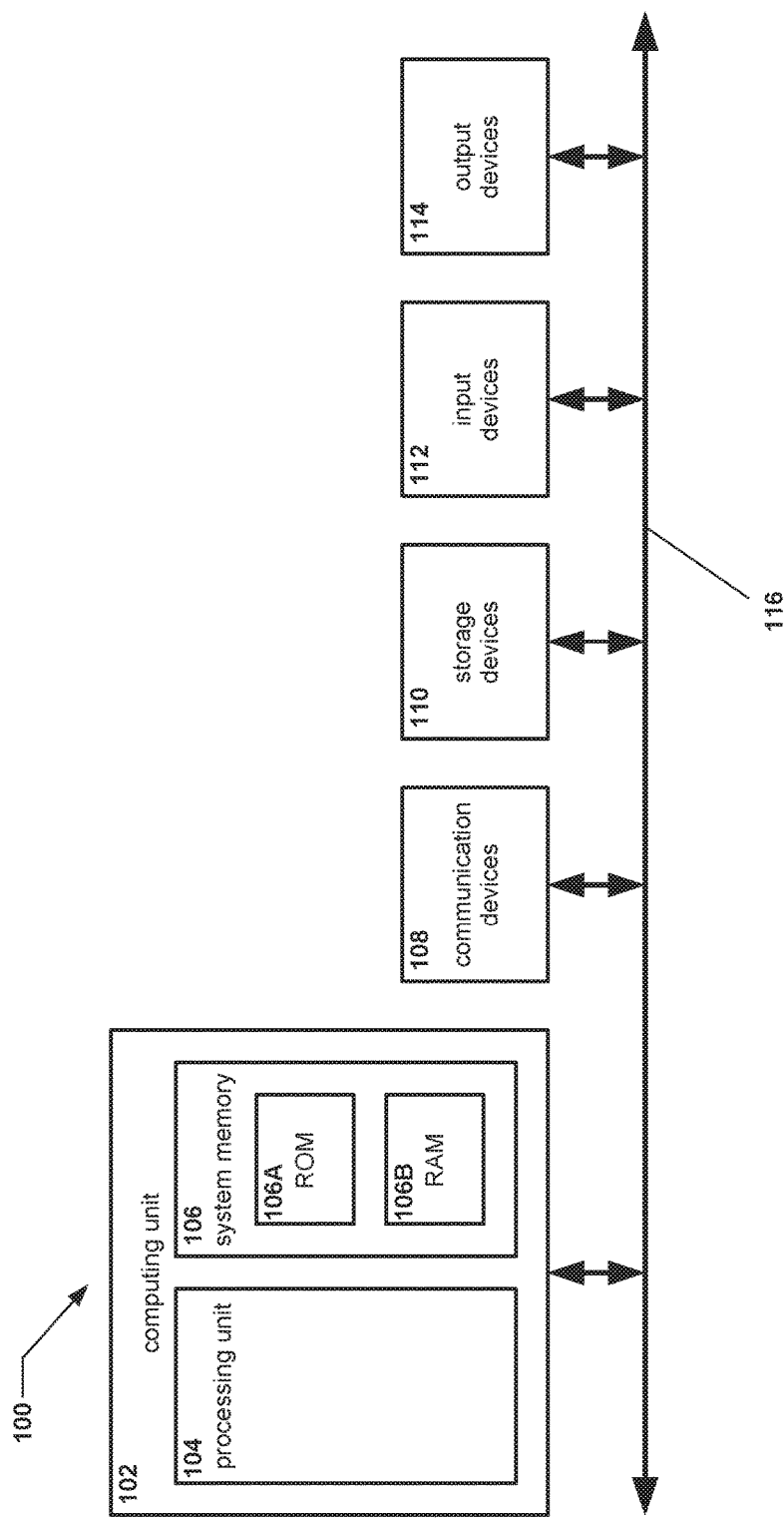
FIG. 1 shows a schematic view of an example of a programmable computing device.

Accordingly, FIG. 1 shows one illustrative example of a computer, computer 100, which can be used to implement various embodiments of the invention. Computer 100 may be incorporated within a variety of devices and systems, including but not limited to consumer electronic devices such as personal media players, cellular phones, smart phones, personal data assistants, global positioning system devices, and the like.

As seen in this figure, computer 100 has a computing unit 102. Computing unit 102 typically includes a processing unit 104 and a system memory 106. Processing unit 104 may be any type of processing device for executing software instructions, but will conventionally be a microprocessor device. System memory 106 may include both a read-only memory (ROM) 106A and a random access memory (RAM) 106B. As will be appreciated by those of ordinary skill in the art, both read-only memory (ROM) 106A and random access memory (RAM) 106B may store software instructions to be executed by processing unit 104.

Processing unit 104 and/or system memory 106 are connected, either directly or indirectly, through a bus 116 or alternate communication structure to one or more peripheral devices. For example, processing unit 104 and/or system memory 106 may be directly or indirectly connected to additional memory storage such as a storage device 110, e.g. a hard disk drive, a removable optical disk drive, a removable magnetic disk drive, a flash memory card, etc. Processing unit 104 and/or system memory 104 also may be directly or indirectly connected to one or more input devices 112, and one or more output devices 114. Input devices 112 may include, for example, a keyboard, touch screen, a remote control pad, a pointing device (such as a mouse, touchpad, stylus, trackball, or joystick), a scanner, a camera or a microphone. Output devices 114 may include, for example, a monitor display, an integrated display, television, printer, stereo, or speakers.

Still further, computing unit 104 may be directly or indirectly connected to one or more communication devices 108. For example, such communication devices may include but are not limited to network interfaces for communicating with a network. Certain such network interfaces sometimes may be referred to as network adapters and/or network interface cards (NIC). A network interface may translate data and control signals from computing unit 104 into network messages according to one or more communication protocols, such as the Transmission Control Protocol (TCP), the Internet Protocol (IP), and the User Datagram Protocol (UDP). These protocols are well known in the art, and thus will not be discussed here in more detail. An interface or other communication device 108 may employ any suitable connection agent(s) for connecting to a network, including, for example, a wireless transceiver, a power line adapter, a modem, and/or an Ethernet connection.

It should be appreciated that, in addition to the input, output and storage peripheral devices specifically listed above, the computing device may be connected to a variety of other peripheral devices, including some that may perform input, output, storage, and/or communication functions, or some combination thereof (even if other devices as noted with regard to elements 108 through 114 above also are present with similar functionality). For example, the computer 100 may be connected to a digital music player, such as an IPOD® brand digital music player. As known in the art, such digital music players may serve as an output device for a computer (e.g., outputting music from a sound file or pictures from an image file), a storage device, etc.

Likewise, computer 100 may be connected to or otherwise include one or more other peripheral devices, such as a telephone. The telephone may be, for example, a wireless "smart phone," such as those featuring the Android or iOS operating systems. As known in the art, this type of telephone communicates through a wireless network using radio frequency transmissions. In addition to simple communication functionality, a smart phone may also provide a user with one or more data management functions, such as sending, receiving and viewing electronic messages (e.g., electronic mail messages, SMS text messages, etc.), recording or playing back sound files, recording or playing back image files (e.g., still picture or moving video image files), viewing and editing files with text (e.g., Microsoft Word or Excel files, or Adobe Acrobat files), etc. Because of the data management capability of this type of telephone, a user may connect the telephone with computer 100 so that their data maintained may be synchronized.

Still other peripheral devices may be included with or otherwise connected to a computer 100 of the type illustrated in FIG. 1. In some cases, a peripheral device may be permanently or semi-permanently connected to computing unit 102. For example, with many computers, computing unit 102, a storage device 110 in the form of a hard disk drive and/or a removable optical disk drive and an output device 114 in the form of a display are semi-permanently encased in a single housing.

Yet other peripheral devices may be removably connected to computer 100, in addition or instead. Computer 100 may include, for example, one or more communication ports (which may in at least certain instances function as and/or be considered as communication devices 108) through which a peripheral device can be connected to computing unit 102 (either directly or indirectly through bus 116). These communication ports may thus include a parallel bus port or a serial bus port, such as a serial bus port using the Universal Serial Bus (USB) standard or the IEEE 1394 High Speed Serial Bus standard (e.g., a Firewire port). Alternately or additionally, computer 100 may include a wireless data "port," such as a Bluetooth interface, a Wi-Fi interface, an infrared data port, or the like.

It should be appreciated that various embodiments of a computing device may include more components than computer 100 illustrated in FIG. 1, fewer components than computer 100, and/or a different combination of components than computer 100. Some implementations of the invention, for example, may employ one or more computing devices that are intended to have a very specific functionality, such as a digital music player or server computer. These computing devices may thus omit certain peripherals or examples of peripherals shown in FIG. 1, such as a network interface, removable optical disk drive, printers, scanners, external hard drives, etc. Some implementations of the invention may alternately or additionally employ computing devices that are adapted to be capable of a wide variety of functions, such as a desktop or laptop personal computer. These computing devices may have substantially any combination of peripheral devices or additional components, as desired.

In many examples, computers may define mobile electronic devices, such as smartphones, tablet computers, or portable music players, often operating the iOS, Symbian, Windows-based (including Windows Mobile and Windows 8), or Android operating systems.

Figure 2:
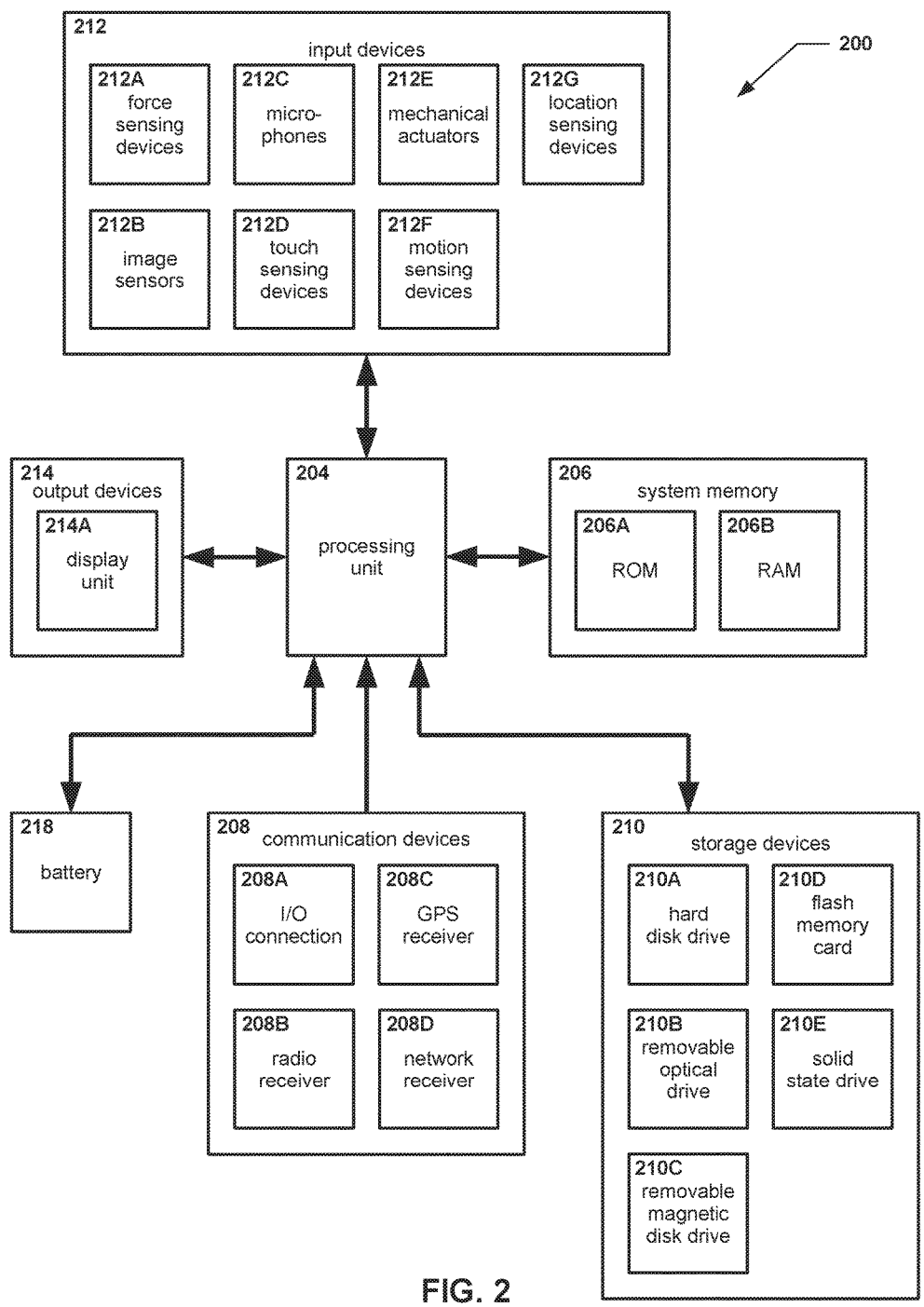
FIG. 2 shows a schematic view of an example of a mobile electronic device.

With reference now to FIG. 2, an example mobile device, mobile device 200, may include a processing unit 204 (e.g., CPU) configured to execute instructions and to carry out operations associated with the mobile device. For example, using instructions retrieved from memory, the processing unit 204 may control the reception and manipulation of input and output data between components of the mobile device. The processing unit 204 can be implemented on a single chip, multiple chips or multiple electrical components. For example, various architectures can be used for the processing unit 204, including but not limited to dedicated or embedded processor, single purpose processors, controllers, ASIC, etc. By way of example, the controller may include microprocessors, DSP, A/D converters, D/A converters, compression, decompression, etc.

In certain cases, the processing unit 204 together with an operating system may operate to execute computer code and produce and use data. The operating system may correspond to well-known operating systems such as iOS, Symbian, Windows-based (including Windows Mobile and Windows 8), or Android operating systems, or alternatively to special purpose operating system, such as those used for limited purpose appliance-type devices. The operating system, other computer code and data may reside within a system memory 206 that is operatively coupled to the processing unit 204. System memory 206 generally provides a place to store executable instructions such as computer code and/or data that are used by the mobile device. By way of example, system memory 206 may include read-only memory (ROM) 206A, random-access memory (RAM) 206B, etc. Further, system memory 206 may retrieve data from storage devices 210, which may include for example a hard disk drive 210A, removable optical drive 210B, removable magnetic disk drive 210C, flash memory card 210D, solid state drive 210E, etc. Such storage devices may be fully integrated or partly/completely removable, for example hard disk drive 210A that is integrated, an optical disc drive 210B that receives and plays removable DVDs, card slots for receiving media such as flash memory cards 210D (or memory sticks), etc.

Mobile device 200 also may include input devices 212 operatively coupled to processing unit 204. Input devices 212 (when present) may be configured to transfer data from the outside world into mobile device 200. As shown, input devices 212 may correspond to both data entry mechanisms and data capture mechanisms. In particular, input devices 212 may include (but are not limited to) the following: force sensing devices 212A such as force sensitive displays and housings; image sensors 212B such as cameras; microphones 212C; touch sensing devices 212D such as touch screens, touch pads and touch sensing surfaces; mechanical actuators 212E such as button or wheels or hold switches; motion sensing devices 212F such as accelerometers; and/or location detecting devices 212G such as global positioning satellite receivers, WiFi based location detection functionality, or cellular radio based location detection functionality. Input devices 212 may also other devices and/or systems than those shown, e.g. a clickable display actuator.

Mobile device 200 also may include various output devices 214, for example being operatively coupled to processing unit 204. Output devices 214 are configured to transfer data from mobile device 200 to the outside world. Output devices 214 may include but are not limited to a display unit 214A as shown in FIG. 2 such as an LCD, LED, etc., and/or may include other devices such as speakers or jacks, audio/tactile feedback devices, light indicators, and the like.

Mobile device 200 also may include various communication devices 208, as may be operatively coupled to the processing unit 204. Communication devices 208 may, for example, include an I/O connection 208A that may be wired or wirelessly connected to selected devices such as through IR, USB, or Firewire protocols, a radio receiver 208B which may be configured to communicate over wireless phone and data connections, and/or a global positioning satellite receiver 208C. Communication devices 208 may also include a network interface 208D configured to communicate with a computer network through various means which may include but are not limited to wireless connectivity to a local wireless network, a wireless data connection to a cellular data network, a wired connection to a local or wide area computer network, or other suitable means for transmitting data over a computer network.

Mobile device 200 also may include a battery 218 as shown in FIG. 2. Additional related and/or comparable elements may include a charging system, an AC power supply, some other power source, etc. For example, battery 218 may be charged through a transformer and power cord or through a host device or through a docking station. For example, considering a docking station as an example, charging may be transmitted through electrical ports, through an inductance charging means that does not require a physical electrical connection to be made, etc.

Various aspects, features, embodiments or implementations described above may be used alone or in various combinations. Methods may be implemented by software, hardware, and/or a combination of hardware and software. Embodiments also may be implemented as computer readable code on a computer readable medium. The computer readable medium is any data storage device that can store data that thereafter may be read by a computer system, including but not limited to both transfer and non-transfer devices as noted above. Examples of the computer readable media include but are not limited to read-only memory, random access memory, CD-ROMs, flash memory cards, DVDs, magnetic tape, optical data storage devices, and carrier waves. The computer readable medium can also be distributed over network-coupled computer systems so that the computer readable code is stored and executed in a distributed fashion.

Figure 3:
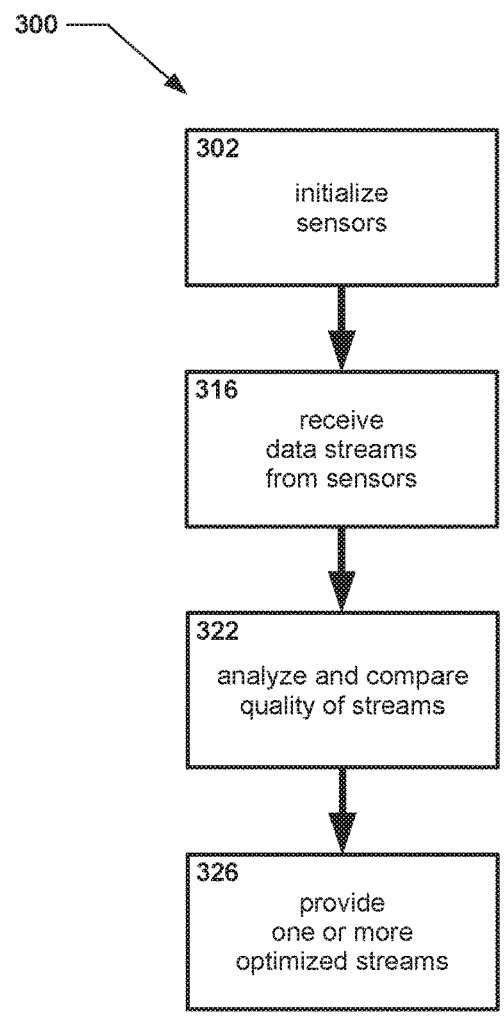
FIG. 3 shows an example method for switching between sensors for optimal performance, in flow chart form.

With reference now to FIG. 3 an example method for switching between sensors for optimal performance is now described. Method 300 functions to supply at least one data stream from an optical sensor that is optimized for such tasks as gesture recognition or 3-D mapping. Additionally or alternatively, method 300 can be used to provide a single composite data stream, selected from the best portions of each sensor data stream.

As used herein, the term "optimized" should be understood functionally, rather than to indicate a "best", "perfect", or "ideal" version. With respect to data streams, optimization of data streams refers herein to an arrangement for selecting a data stream (referred to as a secondary data stream) from among multiple available data streams (referred to as primary data streams), and/or for synthesizing a secondary data stream based on multiple available primary data streams. Typically, optimizing in such fashion may result in a superior outcome as opposed to using any individual primary data stream, e.g. by identifying primary data stream(s) that are well suited to whatever task is to be performed with those data streams, and selecting one (or more) thereof as a secondary ("optimized") data stream. For example, an "optimized" data stream will result in the system functioning adequately, and/or in some sense more effectively, as opposed to the system's function without data stream optimization.

However, it is emphasized that an optimized data stream may not necessarily be "the absolute best" in objective or even subjective terms, nor is such required. For example, if two primary data streams are approximately "just as good" (however defined), a determination of which primary data stream is best is not necessarily required. While determining precisely which of those two primary data streams is "the best" is not prohibited, in such instance it may be equally suitable simply to choose either of the two primary data streams as a secondary data stream, even if the primary data stream chosen is no better than (or is even worse than) the non-selected primary data stream.

Moreover, it is not required that an optimized data stream necessarily will be either perfect or even particularly good, and again such is not required. For example, under certain lighting conditions a system with both RGB and NIR sensing capabilities both RGB and NIR data streams may be of poor quality for certain tasks; if there is no "good" data stream, then selecting either RGB or NIR as a secondary data stream (or synthesizing a secondary data stream from the RGB and NIR data streams combined) still may result in a poor quality secondary data stream. However, perfection is not required.

Thus, although it may be desirable for an optimized data stream to be superior to all others and of excellent quality, in practice this may not be the case, and is not required. While improved functionality over non-optimized data streams is to be desired, it should be understood that 100% effectiveness is not necessary.

Again with reference to FIG. 3, method 300 provides an optimized data stream from an optical sensor. The arrangement in FIG. 3 may address certain challenges as may exist within conventional methods. For example, where a single sensor data stream is utilized, the particular properties of that sensor may impact subsequent analysis, and in certain circumstances, may inhibit desired functionality. A sensor that performs well in bright light, but that does not provide a clean signal in low-light conditions, may limit performance of gesture recognition in low light situations where that sensor is the only available source for a sensor data stream. Likewise, a sensor that addresses a limited visual spectrum, such as the near infrared (NIR), while omitting some or all of the visible and/or UV spectrum, may exhibit limited functionality compared with what might be enabled if additional data from UV and/or RGB sensors could also be considered.

As shown in FIG. 3, method 300 includes initializing multiple sensors in initialization step 302. For purposes of example such sensors are referred to at places herein as cameras and/or imagers, however this is an example only and should not be understood as limiting. Various embodiments may use sensors other than cameras, imagers, etc., and the selection of sensors is not limited unless specifically noted.

Data streams are received in receiving step 316 from the various sensors. Data streams from the sensors represent "raw materials" from which an optimized data stream is selected and/or synthesized, thus the raw data streams received immediately from the sensors are referred to herein in certain instances as "primary data streams."

The primary data streams from the sensors are analyzed and compared in analysis and comparison step 322, with regard to the quality of those data streams, to determine one or more optimized data streams from among the primary data streams. Primary data streams may be compared against one another, and/or may be compared against some external standard, and may be compared in a variety of manners.

Still with reference to FIG. 3, the aforementioned one or more optimized data streams then are provided to one or more data stream recipients in step 326, such as a processor, an application or other data entity instantiated on a processor, a hardware device, etc. Typically, though not necessarily, such data stream recipients may use the optimized data stream(s) for further action and/or analysis. Optimized data streams are also referred to herein as "secondary data streams". As discussed above with reference to optimization, in some instances when a secondary data stream is selected from among primary data streams without modification, the secondary data stream may be identical or at least nearly identical to one of the primary data streams. For clarity a distinction is made between primary data streams, which are raw data as provided by sensors, and secondary data streams, which are optimized data to be provided to some "downstream" data stream recipient.

For clarity, as used in this application "processor" refers to a computing system, which includes a processing unit and associated memory and program storage, along with any necessary firmware and software to allow the processing unit to load an executable program from storage and execute it. Similarly, to "instantiate" an application, data entity, or other executable entity encompasses the process of loading the executable application, data entity, program or other entity from storage into memory, and setting the processing unit to execute the entity.

Sensor initialization step 302 can be handled by a hardware controller (described further below), e.g. in conjunction with low-level software routines, and initiates the various cameras and/or other sensors that provide primary data streams for analysis in step 322. Initialization may include but is not limited to supplying power to the various cameras and/or other sensors, setting any adjustable parameters and features of the sensors, e.g. aperture, shutter speed, ISO/gain settings, aspect ratio, spectrum, filters, frame rates, etc., and allocating hardware resources such as memory buffers and interrupts. Following initialization step 302, in receiving step 316 the various primary data streams from the cameras and/or other sensors are provided in a fashion suitable for analysis. Some parameters, such as frame rates, for example, may need to be synchronized in the initialization step, depending on the intended purpose of the primary data streams, the functional requirements of any recipient of a secondary data stream, the particulars of the processor, etc.

In analysis and comparison step 322, the primary data streams from each of the various cameras and/or sensors may be continuously monitored and analyzed to determine suitability of the data stream for a predetermined designated purpose. Analysis and comparison step 322 may vary depending on the designated purpose for which the secondary data stream is to be used. For example, where method 300 is being employed to supply a secondary data stream (or multiple secondary data streams) based on primary data streams from an near infrared (NIR) sensor and an RGB sensor for gesture recognition, a clear signal for recognizing motions may be desired. Infrared sensors can wash out in bright light, such as full sun, and may be poorly suited for gesture recognition in such conditions. On the other hand, RGB sensors (e.g. conventional CMOS imagers) may function well in bright light, but may become indistinct in low lighting situations, providing a mostly black image or an image overwhelmed with random noise where the gain of the sensor is maxed out. Where the lighting conditions in may vary widely, using a primary data stream from either a NIR or RGB sensor alone may be poorly suited for consistent gesture recognition across all potential lighting conditions. For such an example application, analysis and comparison step 322 may include monitoring and comparing the primary data streams from both the NIR sensor and the RGB sensor, and creating the secondary data stream by switching between the two primary data streams depending on whether NIR or RGB is best suited for gesture recognition under the existing conditions at a given time.

Continuing to reference FIG. 3, if analysis and comparison step 322 of primary data streams determines that the NIR sensor is supplying a primary data stream with predominately high-value pixels, which may be indicative of a washed out image, the RGB primary data stream may be used as the secondary data stream. Conversely, if the RGB primary data stream is predominately low or zero-value pixels, indicative of extreme low light, the NIR primary data stream may be used as the secondary data stream to provide a better result. It will be appreciated by a person skilled in the relevant art that this is merely one example of a possible analysis and, as mentioned above, the actual analysis being performed will vary depending on the intended use and purpose of the sensor data stream.

Moreover, analysis and comparison step 322 may be combined with initialization step 302 and/or receiving step 316 to provide further options beyond simply switching between sensors. For example, depending on the sensor package used in conjunction with method 300, it may be sufficient to merely switch shutter speeds, apertures, and/or ISO or gain settings to improve performance, rather than switching to a different sensor (which may have less resolution, draw more power, have other undesirable characteristics, etc.). In such a case, analysis and comparison step 322 may, depending on implementation, loop back to initialization step 302 to request a change in hardware status.

The results of analysis and comparison step 322 lead into providing optimized data streams in step 326, where the optimized secondary data stream is provided to the application, functionality, or other data stream recipient that is to carry out some intended purpose. The format of how the data stream is provided may vary depending on the needs and capabilities of the data stream recipient. For example, a single data stream, comprised of frames dynamically switched between sensors, may be provided where the application only needs a single stream, and benefits from being "agnostic" as to the sensor source. Conversely, the data streams from all sensors in the sensor package could be provided, along with a continual stream of instructions informing the receiving application of the desired or most optimal data stream, where the application can make use of multiple sensor data streams. Still further, providing an optimized secondary data stream in step 326 could combine ideal data from any or all received streams to supply a single secondary (optimized) data stream that is a hybrid of some or all received primary data streams (and/or that may include additional information). A person skilled in the relevant art will recognize that these are only examples of possible output steps, and are not intended to be an exhaustive list. Providing an optimized secondary data stream in step 326 may be varied considerably so as to provide a secondary data stream or streams to the data stream recipient.

As noted, numerous embodiments and variations of methods as described herein are possible, and may be useful in at least certain instances. Several such variations are shown and described herein, though it should be understood that these are examples only, and other arrangements may be equally suitable.

Figure 4:
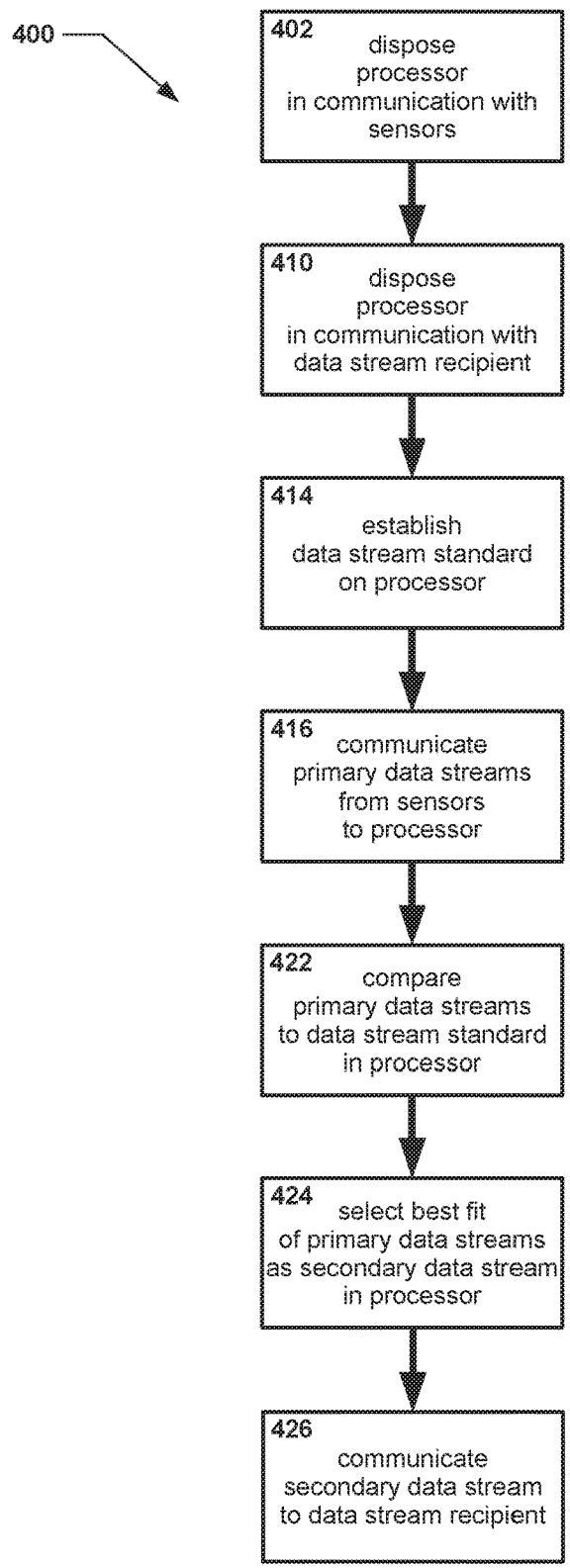
FIG. 4 shows an example method for switching between sensors for optimal performance, with regard to example implementation with executable instructions on a processor, in flow chart form.

Referring to FIG. 4, another example method 400 for switching between sensors for optimal performance is shown. Although the arrangement in FIG. 4 may be similar at least conceptually to that in FIG. 3, method 400 considers as an example an arrangement for implementation using executable instructions instantiated on a processor. Such a processor may be present within an electronic device such as a smart phone, head mounted display, desktop PC, tablet, etc., although other arrangements also may be suitable.

In the method 400, a processor is disposed in step 402 in communication with two or more sensors. The sensors may vary considerably; for purposes of explanation sensors are referred to as being cameras or other imagers, such as RGB cameras, NIR cameras, time-of-flight depth cameras, thermal cameras, etc. However, while such may be suitable, these are examples only, and are not limiting. Depending on the embodiment, disposing the processor in communication with sensors may include physically connecting a processor to sensors, wirelessly connecting, initializing communication, making software or hardware adjustments between sensors and processor, etc.

The method 400 also includes disposing the processor in communication with at least one data stream recipient in step 410. The data stream recipient(s) may vary considerably; for purposes of explanation data stream recipients are referred to in places herein as applications, programming layers, or other data entities. However other arrangements, including but not limited to data recipients in the form of hardware, also may be suitable. As with disposing the processor to the sensors, disposing the processor in communication with the data stream recipient again may include making a physical or wireless connection, initializing a device or data entity, etc.

A data stream standard is established in step 414 on the processor. The data stream standard represents some criterion by which a data stream may be evaluated (as described in more detail subsequently herein). For example, a data stream standard may represent a minimum or maximum light level, or an intermediate range of light levels. Data stream standards may be simple, such as a "hard" cut-off of 10 lux as a minimum value; however, data stream standards also may be complex, including complex algorithms, considerations of many dependent or independent factors, etc.

Furthermore, data stream standards may include some degree of abstraction. For example, some numerical quality value, such as a "1 through 10" rating, might be part of a given data stream standard, so as to represent the degree to which different levels of illumination are suitable for a particular sensor. Use of such an abstract standard can allow for ad hoc comparison of different primary data streams that come for sensors of varying technology. Where an abstract standard is employed, primary data streams will typically be preliminarily examined and their quality abstracted before being processed according to the data stream standard. In one possible implementation, a primary data stream from an RGB sensor could be assigned the following scale on the basis of measure light intensity: 5 lux or less might be rated as 1, 5 to 7.5 lux as 2, 7.5 to 15 lux as 3, 15 to 25 lux as 4, etc. Conversely, where the primary data stream comes from a NIR sensor, the scale may be recalibrated for smaller fractions of lux. Such scales are preferably calibrated so that each 1-10 rating approximately corresponds to equivalent primary data stream quality with due consideration given to sensor technology, viz. a "5" rating will yield approximately identical quality regardless of sensor technology. Comparisons thus may be performed regarding such ratings, rather than directly on the actual light level. It should be appreciated that reference to light level is only one possible example data stream standard, and that data stream standards are not limited only thereto.

In addition, data stream standards may be specific to a given processor, device, sensor, and/or data stream recipient, and/or may vary based on the settings or particulars of a processor, device, sensor, and/or data stream recipient. For example, a processor in communication with four sensors may have established four different data stream standards, one for each sensor. In other embodiments, more than one data stream standard per sensor or a single data stream standard for multiple sensors also may be suitable.

Establishing a data stream standard on the processor as shown in FIG. 4 and elsewhere herein may encompass a range of events. For example, a data stream standard may be created computationally (e.g. in a processor), may be read from stored data (e.g. instantiated onto a processor from a hard drive or solid state drive), may be received as communication from some external system, defined based on inputs, some combination thereof, etc. Unless otherwise specified, the manner by which various features may be established is not limited, nor is the actor (if any) that establishes those features limited.

Continuing in reference to FIG. 4, it is noted that data stream standards (and also comparisons against data stream standards as described in more detail below) may vary not only with regard to particulars, but with regard to a general notion of what the standard addresses. For example, at least three broad classes of data stream standards may be considered: environment, content, and function. These should not be understood as limiting.

An environment data stream standard may refer to some property of an environment. For example, continuing the previous discussions of light level, minimum light level may be considered an environment property. Other environment properties may include, but are not limited to, light levels at specific wavelengths or bands of wavelengths (e.g. ultraviolet, 700 to 1100 nm, 489.3 nm sodium-D emission, etc.), average light levels over time, position in space, time, temperature, etc. Substantially any property that reflects some description of "the world" or some portion thereof may be considered as an environment property.

A content data stream standard may refer to some property of the data stream itself. For example, the dynamic range of an image frame, the minimum or maximum total input level for that frame, the minimum or maximum input level of some channel for that frame (e.g. the highest red, green, or blue value for any pixel in a given image), the noise level within an image, the color balance within an image, the presence, size, persistence, etc. of "white out" or "black out" regions within an image, etc. may be considered content properties. Substantially any property that reflects some description of the data stream itself or some portion thereof may be considered as a content property.

A function data stream standard may refer to some property regarding the functionality and/or usability of a data stream for a given purpose. For example, if a camera feed is being considered for use in detecting gesture input, the ability to detect inputs, the ability to distinguish inputs from one another, the confidence in detecting inputs and/or distinguishing inputs from one another, the ability or confidence to detect and/or distinguish individual steps in an input (e.g. particular stages of a complex gesture), etc. may be considered function properties. Substantially any property that reflects some description of the functionality of the data stream or some portion thereof may be considered as a function property.

It is noted that some degree of overlap may exist between environment, content, and function properties. For example, it may be possible to determine the light level in an environment (an environment property) by evaluating the brightness of pixels in an image frame (a content property). Thus an environment property (light level) may be determined from the content of a data stream (camera feed). Such an arrangement is not prohibited.

Furthermore, embodiments are not necessarily limited to considering only one of environment, content, and function properties. Data stream standards (and comparisons thereof) may consider substantially any combination of environment properties, content properties and function properties, and/or any other properties for which a data stream standard is defined. It is not required that all data streams in a given embodiment consider the same properties, or that any data stream consider the same properties under all conditions. Thus, data stream standards may change over time due to changing conditions, different combinations of sensors, different data stream recipients, or for any other appropriate reason that suggests an alteration to one or more employed data stream standards.

Continuing in FIG. 4, primary data streams are communicated in step 416 from the sensors to the processor. Typically, though not necessarily, each sensor may deliver a single data stream. However, other arrangements wherein two or more sensors cooperate to deliver one primary data stream (e.g. a stereo camera delivering two feeds for consideration as a stereo pair) or wherein one sensor delivers two or more primary data streams (such as a wide-spectrum camera delivering near infrared, visible, and ultraviolet bands as distinct data streams), also may be suitable.

As noted previously, a primary data stream is a data stream that represents "raw material" for optimization. Typically, primary data streams may be received directly from sensors, without modification, but this is not required. For example, a video feed from a camera may be pre-processed in some fashion before being communicated in step 416 to the processor although not strictly "raw data", such a video feed still may be considered as a primary data stream herein.

In addition, it is not required that a primary data stream necessarily must represent all data generated by a given sensor, or only data generated by that sensor. For example, if a camera defaults to producing 60 frames per second but a particular task for which that data stream may be used requires updating only 10 times per second, frames may be discarded (e.g. to reduce processing demands by considering fewer frames). Similarly, if a clock time or GPS position for the frames is considered useful, time or position stamps may be added to frames as metadata. In either instance, the modified camera feed still may be considered as a primary data stream.

Continuing in FIG. 4, the primary data streams are compared in step 422 against the relevant data stream standards in the processor. Thus, to continue the example of light levels, the light level of an RGB camera data stream may be compared to some minimum light level.

Comparison may be independent or interdependent with regard to multiple data streams and data stream standards. That is, each primary data stream may be considered independently against a standard, to determine, for example, whether a given data stream is "good" or "good enough." Such determinations can possibly be made through some numerical rating, though other approaches such as simple binary "yes/no" or "usable/not usable" evaluations also may be suitable. Alternatively, primary data streams may be compared against one another in some manner; for example, it may be determined that a near infrared camera data stream is better than an RGB camera data stream at some point in time.

Comparisons may be simple or complex, and may be direct, such as comparing dynamic range in one image feed vs. dynamic range in another or vs. some required value for dynamic range. Comparisons could also be indirect, such as determining quality values like the 1 to 10 scale discussed above for the quality/usefulness of a data stream. Comparisons may consider multiple factors, for example dynamic range and resolution, or overall brightness and frame rate. In such instances standards and/or comparisons may be "multi-dimensional", that is, considering two or more factors (x and y, or x, y, and z, etc.) rather than merely "higher is better" or similar.

Although data streams are referred to in places as being compared against one another, and are described in places as being "good", "good enough", etc., it should be understood that such evaluations may not necessarily refer directly to the data itself. Considerations may address environment and/or function in addition to or instead of content. For example, if standards and comparisons address environment properties, such as light level, one data stream may be selected as being "optimal" based not on the actual content of that data stream, but instead by the light levels where the sensor originating that data stream is located.

Still with reference to FIG. 4, a "best fit," or optimized, data stream is selected in step 424 from among the primary data streams to create the secondary data stream. The manner of selection is not limited, but typically will depend on the particulars of the data stream standards and the comparison of the data streams. For example, data stream standards and comparisons considering light levels may be such that an RGB data stream is considered a best fit to standards at light levels above 40 lux, and that a NIR data stream is considered a best fit to standards at light levels below 40 lux.

The simple "cut-off at 40 lux" approach described above is an example only, and is not limiting. For example, determinations may be computationally very complex, considering many different factors, weighted differently, and choosing from among many different primary data streams, rather than just two such as RGB and NIR. In addition, determinations may not necessarily select one primary data stream as being distinctly the best fit. To continue the example above, for some embodiments an RGB data stream may be considered a best fit above 50 lux, an NIR data stream would be a best fit below 25 lux, and the RGB and NIR data streams would be equally acceptable—in some sense both a best fit—between 25 and 50 lux.

Following selection, the selected primary data stream is considered the secondary data stream, which may also be referred to as an optimized data stream. In step 426 the secondary data stream is communicated to the data stream recipient. For example, a system implementing method 400 that includes an RGB video feed, a NIR video feed, a stereo 3D sensor feed and a time-of-flight depth sensor feed as primary data streams, and a gesture recognition application as a data stream recipient, would provide an optimized secondary data stream selected from among the primary data streams provided by the above-listed various feeds. Essentially, the method 400 picks out the best primary data stream in terms of data for gesture recognition, and forwards that data stream to the gesture recognition application, software layer, or other intended recipient.

Given such an arrangement, the data recipient need only consider data already evaluated as being optimized: the best available or at least as being good enough for intended purposes. It is not necessary for the data recipient to devote resources to processing all four data streams; nor is it necessary for the data recipient to merely rely on a single data stream in all conditions and evaluate possibly inferior data in hopes of still achieving acceptable performance. Thus, the arrangement in FIG. 4 may enable decreased resource demands (e.g. processor size, heat load, power consumption, processor cycles, etc.), and/or may enable improved performance, such as by relying on RGB in well-lit environments but using NIR in dimly-lit environments.

Method 400 does not explicitly illustrate any particular functions to be performed with the secondary data stream, or the end results. Recipients of the secondary data stream may perform a wide range of functions to obtain a variety of end results. For example, gesture recognition may be performed by a device implementing method 400 upon the secondary data stream communicated in step 426 to the data recipient. Gestures so recognized then might be provided to other applications or processes running upon the device as input, thereby controlling the processor, other applications or processes running upon the device, as well as any other systems or hardware in communication with the processor. As a further example of an application of method 400, the operation of a head mounted display or other electronic device might be controlled so as to change what is shown on associated screens, open or close programs, change settings, send or receive messages, provide information or entertainment to a user of such a device, or any other task that the device is configured to perform.

Although step 426 refers to a single secondary data stream, other embodiments may select and provide two or more secondary data streams. For example, if multiple data recipients are present with different functions and/or data needs, each data recipient may receive a secondary data stream optimized for that particular data recipient. Likewise, some data recipients may require or benefit from multiple incoming streams of data. Furthermore, any given secondary data stream may be sent to more than one data stream recipient, such as the same secondary data stream being sent to both a gesture recognition application and a face recognition program.

Figure 5:
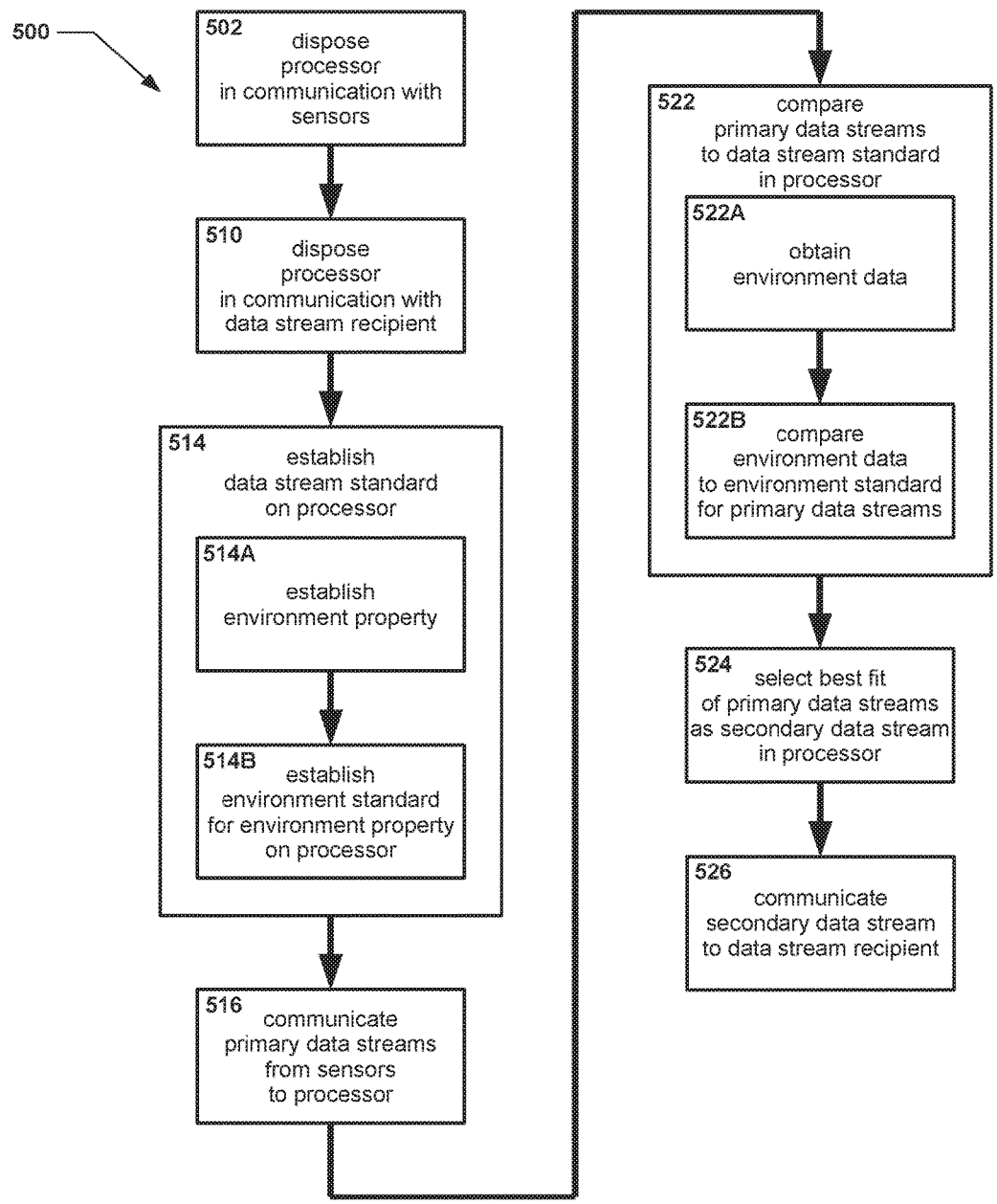
FIG. 5 shows an example method for switching between sensors for optimal performance, considering environment properties, in flow chart form.

FIG. 5 shows an example method 500 for switching between sensors for optimal performance, considering environment properties. As method 500 in FIG. 5 shares a number of similar or identical steps to method 400, not all corresponding steps shown in FIG. 5 are described in detail. The reader is referred to the foregoing discussion of method 400 for more detail on those similar steps.

In method 500, in step 502 a processor is disposed in communication with sensors, and is further disposed in step 510 in communication with a data stream recipient.

A data stream standard is established in step 514 on the processor. As previously noted, data stream standards (and comparisons thereto, etc.) may refer to environment properties; FIG. 5 shows an example arrangement of such. An environment property is established in step 514A. That is, in some manner—whether by human selection, algorithm, reading from a data store, etc.—some property of an environment is specified and made available to the processor. In addition, an environment standard is established in step 514B for that environment property. Again, in some manner (e.g. similarly) some minimum, maximum, range, numerical weighting, algorithm, etc. is specified and made available to the processor.

For example, the environment property and environment standard therefor may be disposed in a data storage device such as a magnetic hard drive, solid state drive, etc. When the processor is to perform steps in method 500, the appropriate information may be instantiated onto the processor from the data storage device. In such an example steps 514A and 514B (and potentially the method as a whole) may in some sense be performed when some governing application is instantiated onto the processor, though it may also be suitable to consider such steps (and potentially the method as a whole) as being performed when that application is coded, installed, or at some other point.

In addition, while establishing the environment property in step 514A and establishing the environment standard in step S148 are shown as distinct steps—for example, identifying what property is to be considered, and what particular values are considered relevant for that property—this is an example only. In practice, it may not be necessary or useful for all embodiments to establish a property as a distinct step from establishing a standard, since in some sense "set a light level of 25 lux as a minimum" at least implies that light level is the property under consideration. Steps 514A and 514B are shown distinctly for clarity, but it should be understood that such steps may be combined in certain embodiments (and that other steps likewise may be combined, subdivided, reordered, etc. unless otherwise specified or required).

Moving on in FIG. 5, the primary data streams are communicated in step 516 from the sensors to the processor.

The primary data streams are compared in step 522 to the data stream standards in the processor. As noted with regard to step 514 above, in the example method 500 of FIG. 5 the data stream standards refer to one or more environment properties. Thus, comparison step 522 typically will address those environment properties.

Environment data is obtained in step 522A. That is, whatever aspects of the environment are considered with regard to the data stream standards, information on that aspect (or aspects) of the environment around the sensor, and typically though not necessarily around the processor as well, is in some way acquired. For example, the environment data may be obtained in step 522A from additional sensors besides those for which primary data streams are evaluated. As a more concrete example, considering light level as an environment property, a light meter may be disposed proximate the sensors which provide primary data streams, with the light levels detected by that light meter then being obtained as environmental data. Alternately, environmental data may be obtained in step 522A from the data streams themselves. For example, insofar as an RGB camera detects images, typically that RGB camera operates by detecting and measuring levels of light, notably in red, green, and blue bands. Thus, in at least some sense an RGB camera may be considered as, and may function as, a light meter, at least for the purposes of the method 500. Other approaches also may be equally suitable.

The environment data is then compared in step 522B against the environment standard(s), on behalf of the primary data streams. In a strict sense the primary data streams themselves may not be compared against either a standard or one another. However, as previously noted, such an arrangement is acceptable, and for purposes of simplicity may still be referred to herein as "comparing the data streams". Nevertheless, it may be worth noting that technically the comparison of step 522B may represent a comparison of information about the data streams, rather than a comparison of the data streams themselves, in at least certain embodiments. It should also be understood that if the environment data comes from the primary data streams themselves—e.g. light levels in images as in the example above—then the comparison of step 522B may be described even in very strict terms as a comparison of the data streams themselves.

A best fit of the primary data streams with regard to the environment data, environment standard, and comparison thereof is selected in step 524 from among the primary data streams. Still with reference to FIG. 5, that secondary data stream is then communicated to the data stream recipient in step 526.

Figure 6:
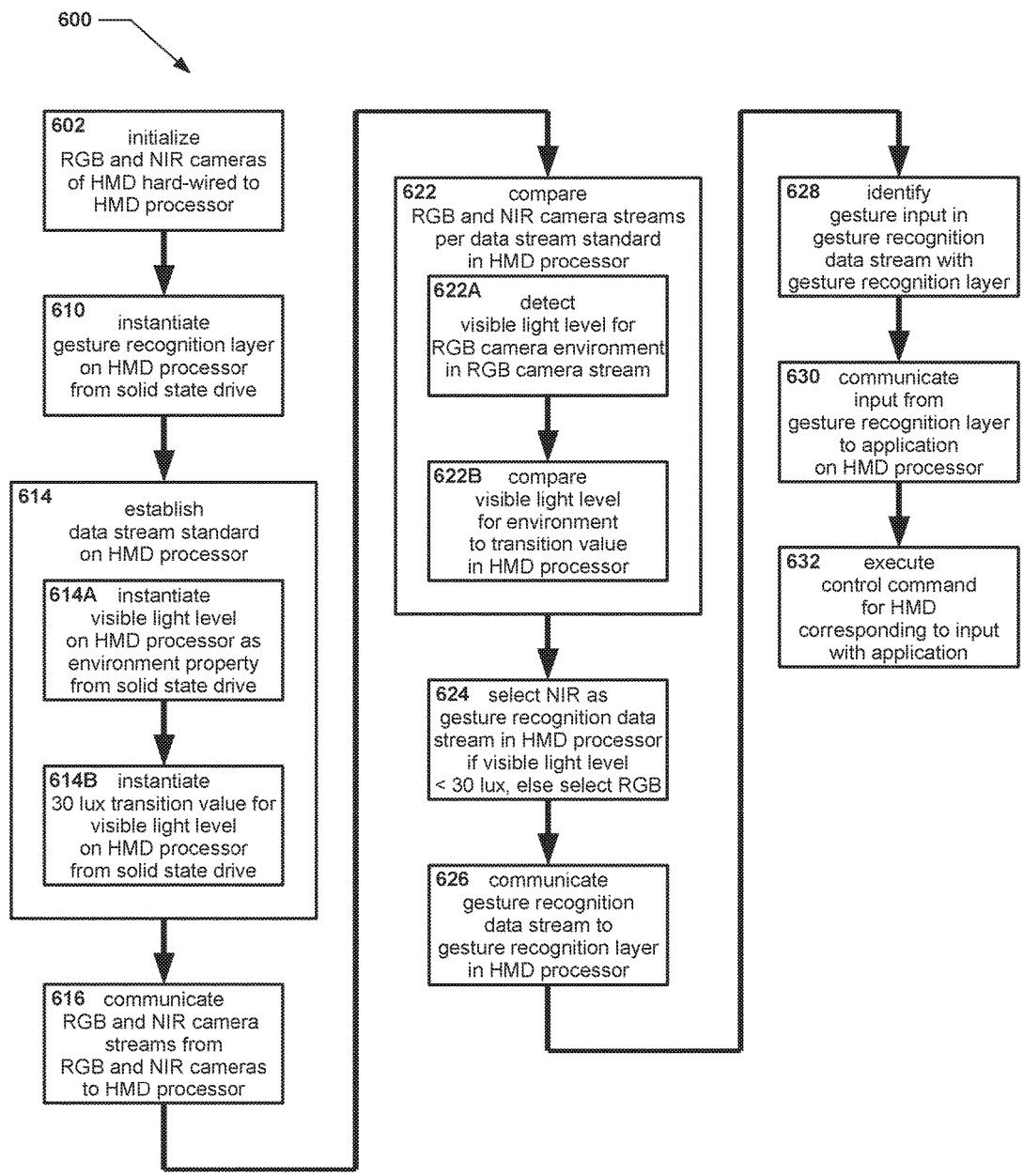
FIG. 6 shows an example method for switching between sensors for optimal performance, specifically considering light level as an environment property with RGB and NIR sensors in a head mounted display, in flow chart form.

Now with reference to FIG. 6, another method 600 is shown therein for switching between sensors for optimal performance. The method 600 in FIG. 6 is presented as a specific and concrete example, addressing a particular device (a head mounted display or "HMD") with particular sensors (RGB and NIR cameras), a particular data recipient (a hand recognition layer), etc. Such concrete details as shown in FIG. 6 are presented for clarity, however, it is emphasized that the method 600 therein is an example only, and should not be considered as limiting.

In the method 600, RGB and NIR cameras that are hard-wired to a processor within an HMD are initialized in step 602. It should be understood that such initialization may represent a concrete example of disposing sensors in communication with a processor, as specific to certain HMDs.

A gesture recognition layer is instantiated in step 610 on the processor of the HMD, being loaded from a solid state drive, also present within the HMD. Again, it should be understood that instantiating the gesture recognition layer in step 610 may represent a concrete example of disposing a specific data recipient in communication with a processor.

In step 614, a data stream standard is established on the processor. This includes instantiating in step 614A the use of visible light levels as an environment property onto the HMD processor from the solid state drive, and also instantiating in step 614B a transition value of 30 lux for visible light levels onto the HMD processor from the solid state drive, as an environment standard.

The RGB and NIR camera streams (i.e. primary data streams) are communicated in step 616 from the RGB and NIR cameras respectively to the HMD processor, via the hard-wired link between cameras and processor (as noted in step 602).

The RGB and NIR camera streams are compared in step 622 according to the data stream standard within the HMD processor. This includes detecting in step 622A the visible light level for the local environment surrounding the RGB camera based on the data within the RGB camera stream itself. For example, images from the RGB camera may be evaluated in the processor to determine, or at least approximate, the light level in the region in the field of view of the RGB camera. Comparison step 622 also includes comparing in step 622B the visible light level for that environment to the 30 lux transition value in the HMD processor.

Still with reference to FIG. 6, in the HMD processor, the NIR camera stream is selected in step 624 as the secondary data stream for gesture recognition if the visible light level in the environment of the RGB camera is less than 30 lux. Otherwise, the RGB camera stream is selected in step 624 as the secondary data stream.

The secondary data stream (in this instance either the RGB or NIR camera streams, depending on visible light level) is communicated in step 626 through the hard-wired link (referenced in step 610) to the gesture recognition layer that is instantiated on the HMD processor. The gesture recognition layer may be understood as at least similar to data stream receivers as previously mentioned herein.

As may be observed, while the method 600 in FIG. 6 may in certain ways resemble that in FIG. 5, the method 600 in FIG. 6 also illustrates additional steps as shown therein, showing an example through which a secondary data stream may be further utilized, e.g. for system control through gesture input. However, this is an example only; in practice the method may not necessarily specify to what use (if any) a secondary data stream may be put; thus certain steps as shown may be considered optional. Concrete use of a secondary data stream for system control is shown for illustrative purposes in the method 600 of FIG. 6, and should not be considered limiting.

Continuing in FIG. 6, the method 600 includes identifying gesture input in step 628 as may be present within the gesture recognition data stream. Such identifying step 628 is accomplished by/within the gesture recognition layer. The input so identified is communicated in step 630 to an application that also is instantiated on the HMD processor. Note that the gestures themselves may or may not be communicated. For example, if a particular gesture is defined to represent an "open program" command, it may be suitable in at least certain instances to communicate an "open program" command from the gesture recognition layer to the application, rather than communicating the gesture. Applications thus may be "agnostic" as to what precise inputs are delivered.

The application then executes in step 632 whichever control command for the HMD corresponds to the input communicated from the gesture recognition layer. Thus, the HMD may change what is displayed, open or close applications, alter settings, send or receive communications, etc. In at least some sense then the optimization of data streams as shown in FIG. 6 may facilitate control/operation of an HMD, or other device or system.

Figure 7:
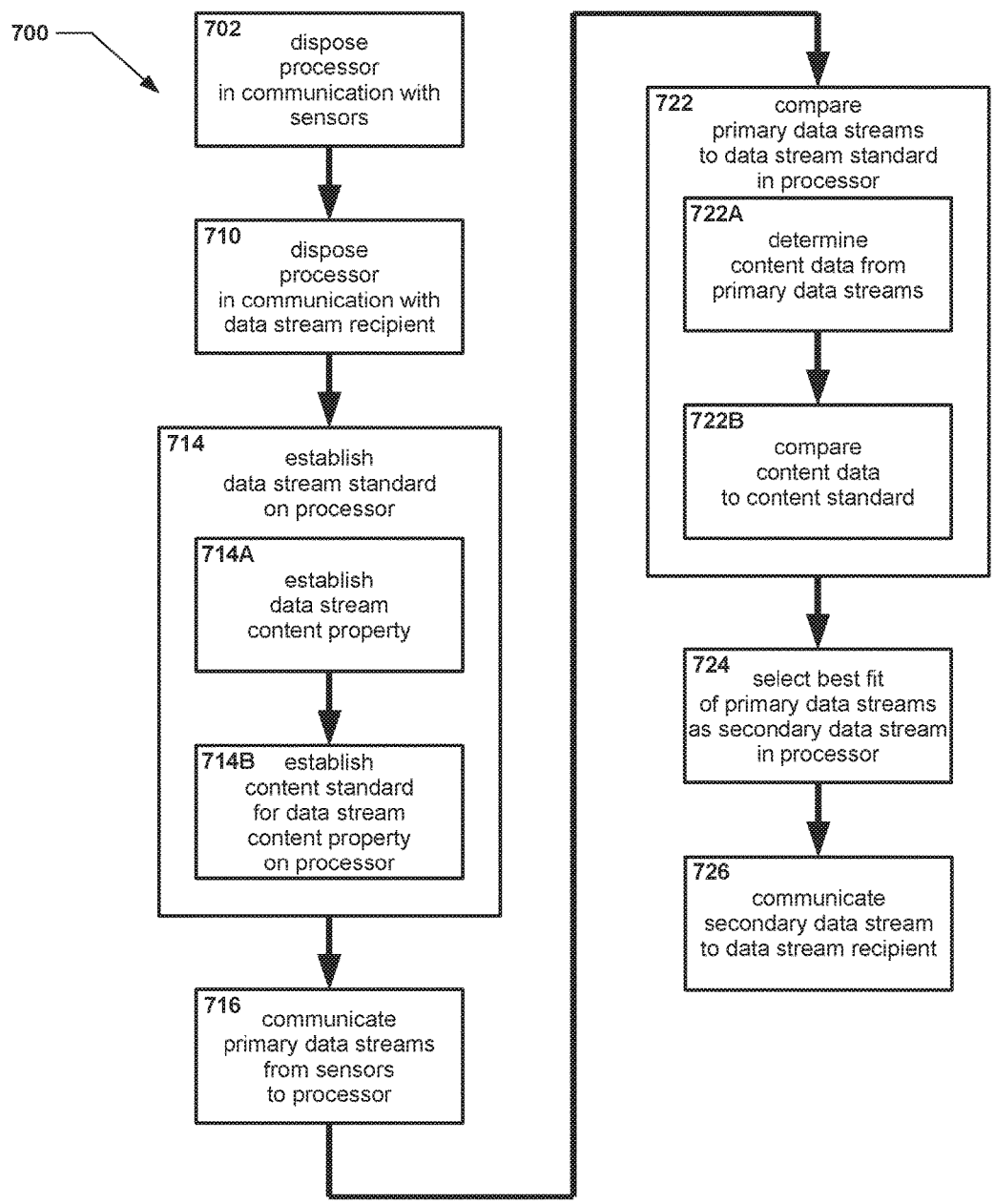
FIG. 7 shows an example method for switching between sensors for optimal performance, considering content properties, in flow chart form.

Now with reference to FIG. 7, an example method 700 for switching between sensors for optimal performance, considering content properties, is described. Method 700 in FIG. 7 is at least somewhat similar to FIG. 5 in concept, and not all corresponding steps shown in FIG. 7 are described in detail.

In method 700, a processor is disposed in step 702 in communication with sensors, and the processor is disposed in step 710 in communication with a data stream recipient.

A data stream standard is established in step 714 on the processor. In the arrangement of FIG. 7, a content property is established in step 714A. That is, some property of the content of one or more of the primary data streams is identified. In addition, a content standard is established in step 714B for that content property: some minimum, maximum, range, numerical weighting, algorithm, etc. is specified and made available to the processor.

While content properties and standards may differ from environment properties and standards in terms of what is being considered (e.g. the content of data streams rather than an environmental), it should be understood that comments made with regard to FIG. 5 as to how various properties and standards may be established, complexity thereof, etc. apply similarly to content properties and standards.

The primary data streams are communicated in step 716 from the sensors to the processor.

The primary data streams are compared in step 722 to the data stream standards in the processor. Since in example method 700 the data stream standards refer to one or more content properties, comparison step 722 typically will address content of data streams.

Content data is obtained in step 722A. That is, whatever features of the content are considered with regard to the data stream standards, information on that feature of the content is acquired, typically though not necessarily through examination of the data streams themselves. The content data is then compared in step 722B against the content standard.

A best fit of the primary data streams with regard to the content data, content standard, and comparison thereof is selected in step 724 from among the primary data streams. Still with reference to FIG. 7, that secondary data stream is then communicated in step 726 to the data stream recipient.

Figure 8:
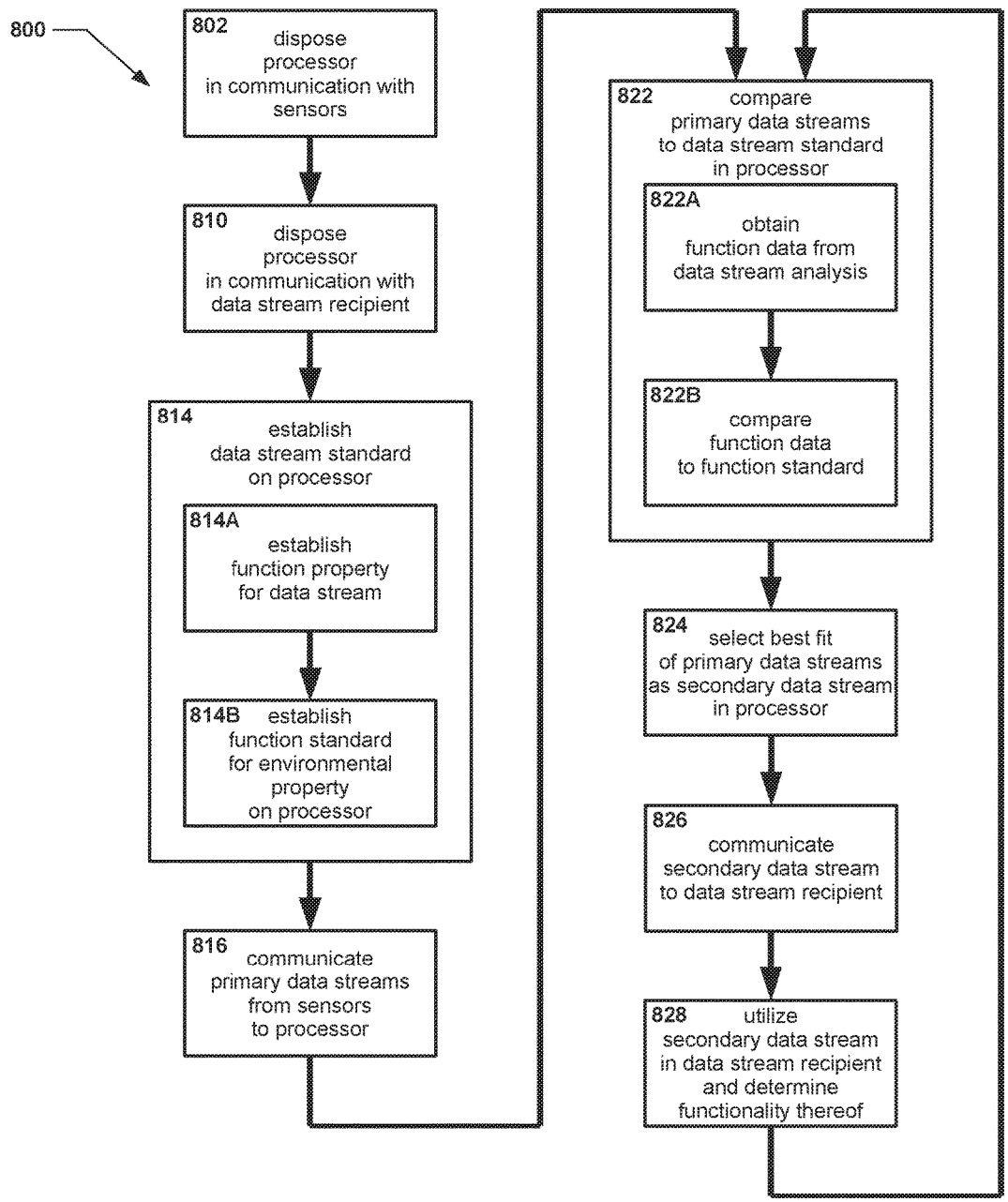
FIG. 8 shows an example method for switching between sensors for optimal performance, considering function properties, in flow chart form.

In FIG. 8 another example method 800 for switching between sensors for optimal performance is depicted, in this instance, where the data stream standard is directed to consider function properties. Again, where corresponding steps have been described previously herein, such discussion may not be repeated in detail.

In method 800, a processor is disposed in step 802 in communication with sensors, and the processor is disposed in step 810 in communication with a data stream recipient.

A data stream standard is established in step 814 on the processor. In the arrangement of FIG. 8, a function property is established in step 814A. That is, some property of the function of one or more of the primary data streams is identified. In addition, a function standard is established in step 814B for that content property.

The primary data streams are communicated in step 816 from the sensors to the processor.

The primary data streams are compared in step 822 to the data stream standards in the processor. Because example method 800 addresses function properties, comparison step 822 typically will address content of data streams.

Function data is obtained in step 822A. That is, whatever features of the function of the data streams are considered with regard to the data stream standards, information on that feature of the function is acquired. The function data is then compared against the content standard in step 822B.

Method 800 is not limited with regard to how the function data is to be obtained in step 822A. In certain embodiments, functional tests may be performed on each primary data stream. Such an arrangement might colloquially be referred to as "pre-testing" the primary data streams. For example, if the intended data stream recipient is known to perform gesture recognition, the primary data streams or portions thereof may be analyzed to determine whether hands or gestures are present therein, the degree to which hands or gestures are visible or distinct, the confidence with which hands or gestures may be identified therein, etc. Such an approach may utilize either the same or different approaches than the data stream recipient; using the same approach may provide confidence that results of analysis in obtaining the data in step 822A may closely represent the actual gesture recognition later on, while using a different approach may allow for faster and/or less resource intensive analysis, such as through using simpler analysis tools, analyzing only part of an image frame, etc.

However, in other embodiments the actual functionality of data streams within the data stream recipient may be considered to determine function data, in addition to or in place of pre-testing analysis. For example, as shown in FIG. 8 method 800 may loop back to step 822 after a secondary data stream has been selected and utilized by a data stream recipient. That is, an already-chosen secondary data stream may be evaluated as to how well that secondary data stream functions for the data stream recipient, and the degree to which that secondary data stream recipient may influence further ongoing determinations as to which of the primary data streams is selected as a secondary data stream. As a more concrete example, if an RGB camera feed has been selected as a secondary data stream as being "optimum" (by whatever standard), but in practice a gesture recognition program (data stream recipient) cannot reliably distinguish one hand position from another, then the poor performance of the RGB camera feed may be considered in future comparisons 822 of primary data streams. Such an approach may be referred to as "post-testing" as distinct from the "pre-testing" noted above.

Post-testing in such manner may exhibit advantages in at least certain instances. For example, post-testing is not based on predictions of what data streams should be most useful for a particular purpose, but rather on whether a given data stream is in fact useful, and possibly how useful, for that purpose.

If, for example, unforeseen factors affect the performance of sensors or their data streams, it may still be possible through the method 800 to identify an optimum data stream. More concretely, consider an RGB camera feed that is of good quality by some standard, but that fails to produce good results. One possible approach may be if a gesture recognition program relies on color models when evaluating data streams, and the user is wearing gloves of some unusual color (e.g. lime green or electric blue, colors not typical for skin tones). Even if the RGB camera feed is clear, well lit, of good resolution, etc., the gesture recognition program may be unable to discern gestures within that feed. Future comparisons of the RGB camera feed with (for example) a time-of-flight depth camera feed that includes color data may consider the actual (poor) performance of the RGB camera feed.

Typically, though not necessarily, function post-testing may be used in combination with some other approach, such as function pre-testing, environment or content considerations, etc. This may be understood, in that post-testing typically presumes that a primary data stream has already been selected as a secondary data stream and sent to a data stream recipient. However, while a combination with another approach may be useful, such is not required. In some embodiments a secondary data stream may be selected from a designated default primary data stream (e.g. "always start with the RGB camera feed"), randomly from among primary data streams, or through some other approach that does not require immediate feedback from the data stream recipient.

In addition, the above example—an RGB camera feed with color data and a time-of-flight depth camera that does not include color data—illuminates a point previously noted, namely, that different data streams may have different properties and/or standards, and may be compared differently. For example, evaluation of an RGB camera feed may consider the color distribution therein, while evaluation of a time-of-flight depth camera may exclude consideration of color since no color data is provided, even if both feeds are under consideration for the same gesture recognition application as a data stream recipient. Thus, while similarity in properties, standards, etc. for different sensors, different data stream recipients, etc., is not prohibited, it may be understood that variation, including extreme variation, also is not prohibited, and may be advantageous.

Likewise, as the criteria by which different primary data streams are judged may be uneven among different data streams, the "fairness" of determinations also may vary. Certain embodiments may be deliberately weighted or otherwise biased towards one sensor or primary data stream at the expense of others. For example, if it is known that a data stream recipient processes time-of-flight depth camera data much more efficiently than RGB camera data, methods may be weighted to prefer selecting the time-of-flight depth camera data stream over the RGB camera data stream. Thus, even if by some standard the RGB camera is producing "better" data than the TOF depth camera, selection may favor the TOF depth camera.

Returning to FIG. 8, regardless of particulars a best fit of the primary data streams with regard to the function data, function standard, and comparison thereof is selected in step 824 from among the primary data streams. That secondary data stream is then communicated in step 826 to the data stream recipient. As noted above, in certain embodiments in step 828 that data stream recipient may utilize the secondary data stream. The functionality of that secondary data stream may then be determined, and considered for future iterations of step 822 (as indicated by the arrow looping back from step 828 to step 822). However, while post-testing in such manner is acceptable and may be advantageous, post-testing is not required, and other arrangements also may be suitable.

Figure 9:
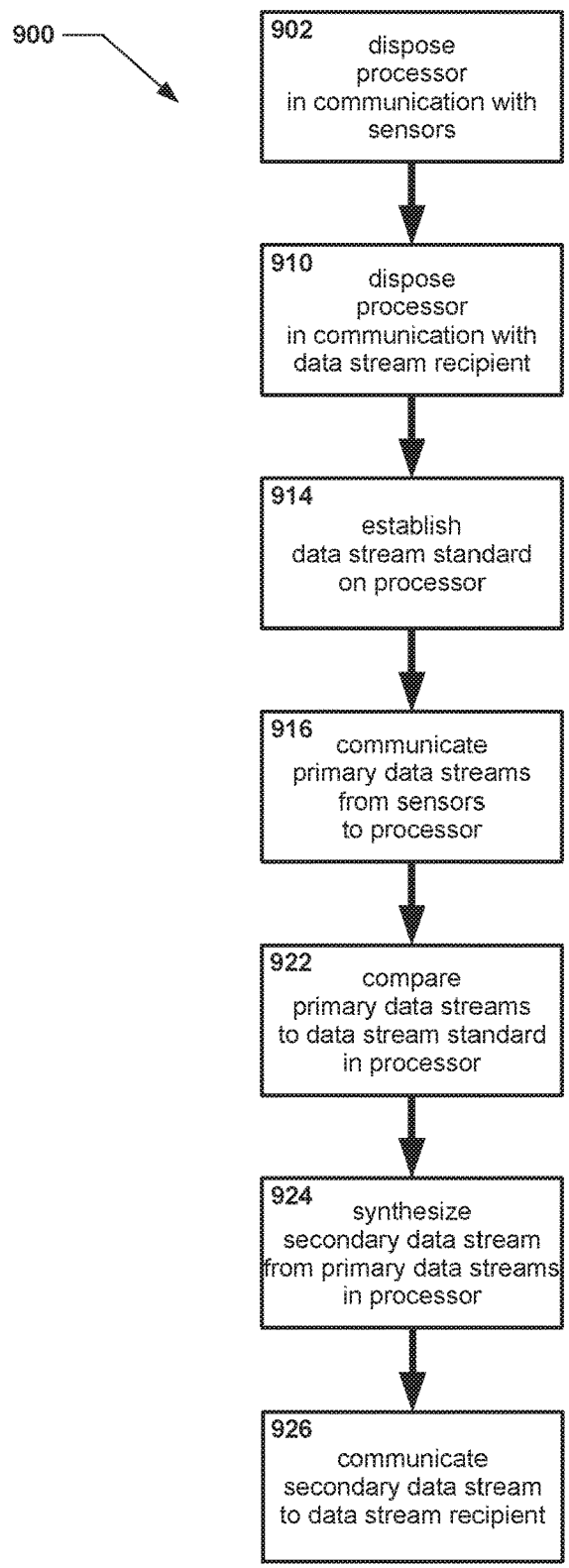
FIG. 9 shows an example method for switching between sensors for optimal performance, including synthesizing a secondary data stream, in flow chart form.

Turning to FIG. 9, another example method 900 is shown for switching between sensors for optimal performance. However, where in certain previous examples herein a secondary data stream is selected from among several primary data streams, in method 900 a secondary data stream is shown to be synthesized instead.

In method 900 a processor is disposed in step 902 in communication with sensors, and the processor is also disposed in step 910 in communication with a data stream recipient. A data stream standard is established in step 914 on the processor. Primary data streams are communicated in step 916 from the sensors to the processor, and those primary data streams are compared in step 922 to the data stream standards in the processor. FIG. 9 does not specify environment, content, or function comparisons; any combination thereof, or alternative arrangements, may be suitable.

Based on comparison step 922 of primary data streams to the data stream standards, a secondary data stream is synthesized in step 924 in the processor utilizing one or more of the primary data streams.

The manner by which a secondary data stream is synthesized in step 924 may vary considerably, and is not limited except as otherwise specified. Typically, though not necessarily, synthesis step 924 of the secondary data stream includes combining certain features of one primary data stream with certain features of another primary data stream. Alternatively, combinations of more than two data streams also may be suitable. Considering gesture recognition as an example data stream recipient, a high-resolution RGB camera signal may provide high quality data defining the edges of a hand and fingers thereof, while a TOF depth camera may have less precise data on the outlines of the hand but could provide data as to whether fingers are extended towards and/or away from the camera position. A synthesized combination of a crisp outline with depth data thus may be superior to either of the RGB or TOF feeds alone.

In colloquial terms, synthesizing primary data streams may produce a secondary data stream with "the best of both worlds". Alternately, synthesizing a secondary data stream may allow weaknesses in individual primary data streams to be de-emphasized or deleted, while retaining useful data.

The number of possible primary data streams is extremely large, and the number of possible secondary data streams that could be usefully synthesized therefrom even larger. Likewise, the number of ways that primary data streams could be combined to synthesize a secondary data stream is extremely large. Substantially any such combination may be permissible, and embodiments are not limited with regard to what primary data streams are combined in synthesis, or what sort of synthesis is performed.

In addition, it is noted that synthesizing a secondary data stream from only one primary data stream also may be suitable for certain embodiments. For example, an RGB camera feed may be changed in resolution, color bit depth, frame rate, etc., visible features may be removed or enhanced, edges may be sharped, etc.

As with secondary data streams selected from among primary data streams, secondary data streams that are synthesized may change over time, such as with differing conditions. For example, a secondary data stream may be synthesized from RGB and TOF data while light levels are high, but may be synthesized from NIR and TOF data when light levels are low. Synthesized secondary data streams also may be weighted, utilize feedback, etc. as previously described with regard to selected secondary data streams.

Returning to FIG. 9, and regardless of the precise manner in which a secondary data stream is synthesized in step 924, that secondary data stream is then communicated in step 926 to the data stream recipient.

Figure 10:
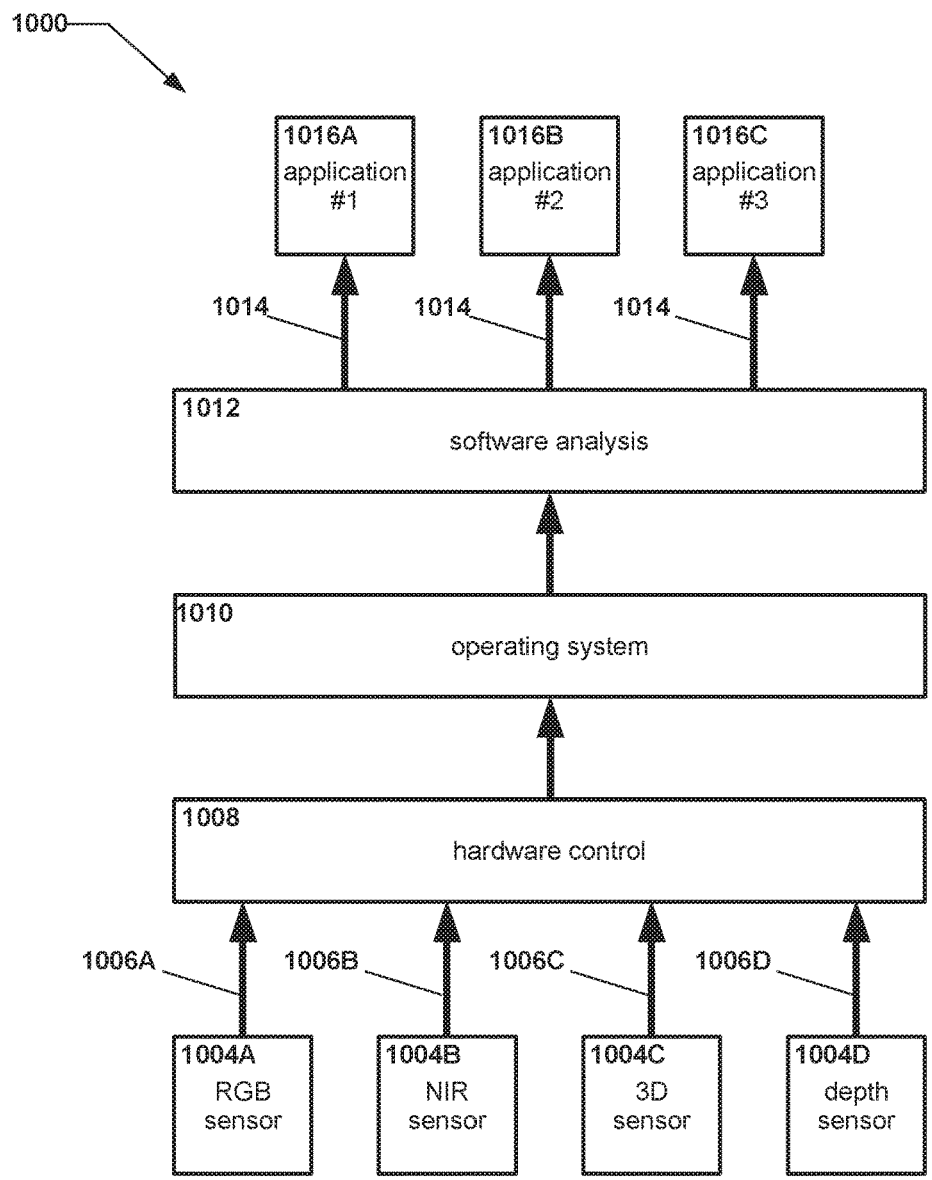
FIG. 10 shows an example system for switching between sensors for optimal performance, in block diagram form.

Now with reference to FIG. 10, an example system 1000 for switching between sensors for optimal performance is shown, in block diagram form. System 1000 shown in FIG. 10 may be suitable for implementing the methods described herein, however this is not limiting. Methods not adapted to be implemented by system 1000 in FIG. 10 may be suitable, and systems not adapted to implemented methods as shown elsewhere herein may be equally suitable.

System 1000 includes a plurality of sensors 1004A through 1004D in communication with a hardware control 1008, and providing primary data streams 1008A through 1006D respectively thereto. The hardware control 1008 is in turn accessed and controlled by an operating system 1010. Running on the operating system 1010 is software analysis 1012, which implements certain steps (e.g. as shown in method 300). Depending on how the software analysis 1012 is implemented, one or more applications 1016A through 1016C are adapted to receive an optimized secondary data stream 1014 that is provided by the software analysis 1012.

In the example shown in FIG. 10, the sensors 1004A through 1004D may include camera types such as charge coupled device (CCD) or complementary metal oxide semiconductor (CMOS) sensors capable of sensing luminosity levels (e.g. black and white pictures), RGB (e.g. color pictures), UV, IR, thermal, or other types of electromagnetic radiation; depth sensors; 3D sensors; or any other type of sensor useful for analysis and detection appropriate to the intended application of the implementing system 1000 that is now known or later developed. In the particular arrangement shown in FIG. 10, four sensors 1004A through 1004D are shown, namely an RGB sensor 1004A, a NIR sensor 10048, a 3D sensor 1004C, and a depth sensor 1004D; however both the nature and the number of sensors 1004A through 1004D shown are examples only, and other arrangements may be equally suitable.

The hardware control 1008 may be a hardware device, such as one including supporting circuitry appropriate to the package of sensors 1004A through 1004D, and may include power supplies and signaling/control logic that provides a low level interface to the sensors 1004A through 1004D that is accessible by at a system software level. However, as noted below the use of a hardware-based hardware control 1008 is an example only, and other arrangements may be equally suitable.

Still with reference to FIG. 10, the operating system 1010 is adapted to support general control of a system, e.g. communicating between various hardware and software entities, etc. The operating system 1010 may be a software-based operating system instantiated on a physical processor, although other possible implementations, such as a firmware-based operating system or even a hard wired operating system could be utilized. The operating system 1010 entity may be any suitable operating system for operating and controlling system 1000. The selection of an appropriate operating system 1010 may take into account the intended purpose of the system 1000, and its form factor. For mobile purposes, such as use in an appliance like Google Glass or a smartphone, a mobile-oriented operating system such as Android, iOS, Windows Phone, or similar such operating system may be employed. Conversely, where system 1000 is implemented in a more tethered or fixed application, such as a laptop or desktop computer, a desktop OS such as Windows, Mac OS X available from Apple, Linux, or other UNIX variant may be an appropriate selection. Moreover, operating system 1010 may be custom-developed, purpose-specific, etc.

Software analysis 1012 is adapted to implement certain steps in methods for switching between sensors for optimal performance, including, but not limited to, method 300. Software analysis 1012 is typically but not necessarily implemented as part of a system library layer of software that runs atop operating system 1010. When implemented as a system library software layer, software analysis 1012 may work internally to support the overall functionality of the system library. For example, a software analysis 1012 in the form of a software layer may be implemented as part of a system library that offers gesture recognition services. Any or all of applications 1016A through 1016C (or other data recipients) may tie into the system library to receive messages and interpretations of recognized gestures. The system library, in turn, may use the software layer of to provide a secondary data stream selected/synthesized from the primary data streams from the package of sensors 1004A through 1004D that is optimized for gesture recognition, and to which software analysis 1012 also performs gesture recognition techniques. When implemented in such fashion, the presence of software analysis 1012 may be invisible to applications 1016A through 1016C and, rather than necessarily receiving an optimized sensor stream 1014, applications 1016A through 1016C may receive messages and/or interpretations of recognized gestures, such as previously noted with regard to step 630 of FIG. 6. Other implementing system libraries may include 3D mapping libraries that provide calling applications 1016A through 1016C with 3D information of the environment sensed by sensors 1004A through 1004D. In such a use, software analysis 1012 may be configured to provide a secondary sensor stream 1014 that is optimized for the specific requirements of 3D mapping and sensing, which may differ from the requirements for gesture recognition.

Alternatively, software analysis 1012 may be implemented as a separate library of its own, capable of being called by various applications, implemented as embedded functionality in a software-based operating system 1010, implemented as hard-coded functionality in a hardware-based hardware control 1008, etc., and may be software, microcode, or implemented as a dedicated ASIC or hardware solution. Software analysis 1012 also may be implemented as a component of any or all applications 1016A through 1016C, where such functionality is not present or provided for at a system or library level, thereby allowing implementation on substantially any system that is equipped with multiple sensors 1004A through 1004D.

Figure 11:
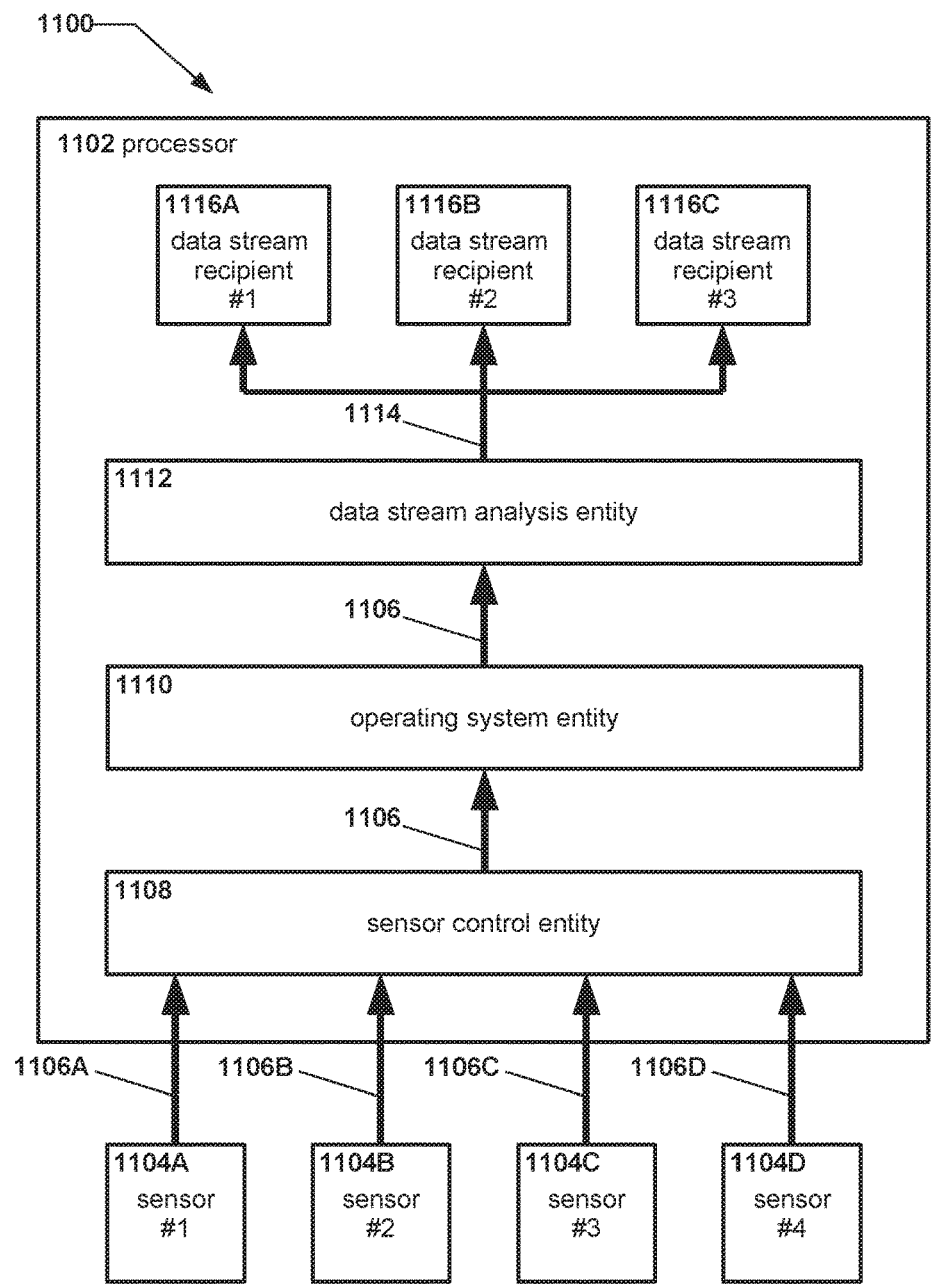
FIG. 11 shows another example system for switching between sensors for optimal performance, in block diagram form.
Figure 12:
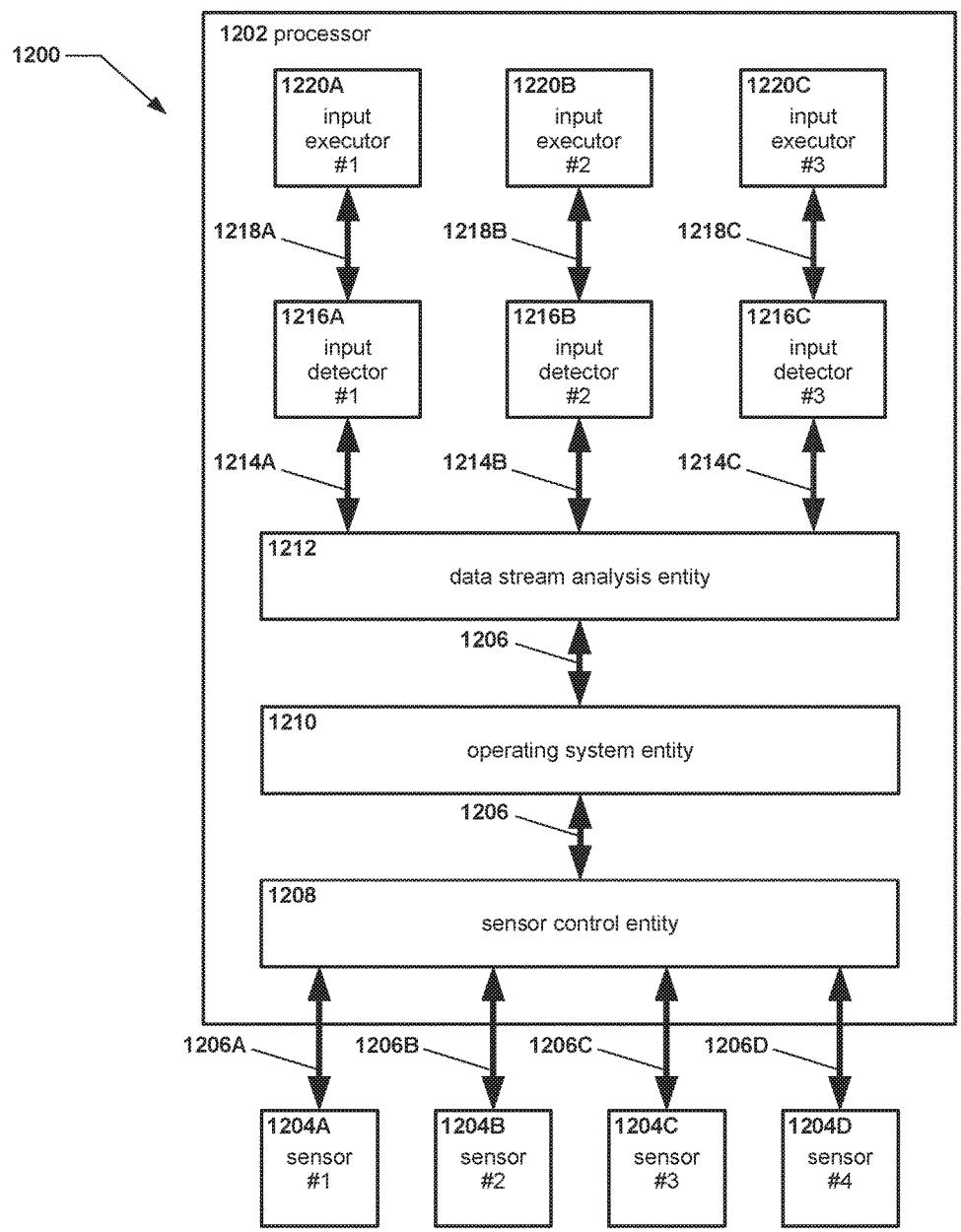
FIG. 12 shows an example system for switching between sensors for optimal performance including input detectors and input executors, in block diagram form.
Figure 13:
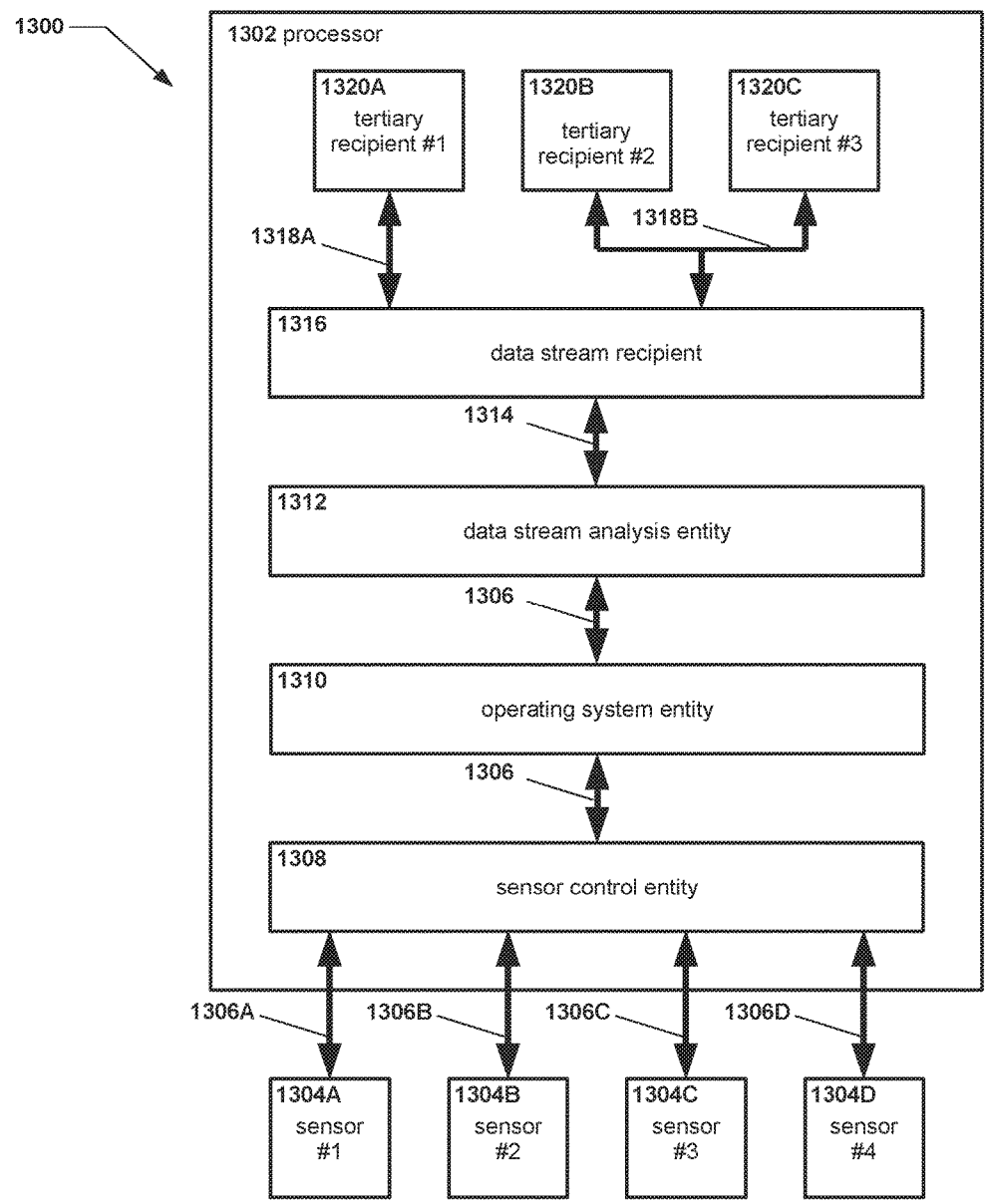
FIG. 13 shows an example system for switching between sensors for optimal performance including a single input detector and multiple input executors, in block diagram form.

Now with reference collectively to FIG. 11 through FIG. 13, several variations on systems for switching between sensors for optimal performance are shown. As noted with regard to FIG. 10, apparatuses and/or other systems may vary considerably, for example with regard to elements being hardware or software, arrangements for communication, which elements carry out which functions, combining functions in one element and/or distributing functions among multiple elements, etc. FIG. 11 through FIG. 13 show certain variations for purposes of illustration, however the examples shown are not limiting, and other arrangements also may be suitable.

Turning specifically to FIG. 11, therein another example system 1100 for switching between sensors for optimal performance is shown, in block diagram form.

System 1100 includes a processor 1102 as shown, with certain other entities (as noted below) instantiated as data and/or executable instructions thereon. However, it is emphasized that such an arrangement is an example only, as may be seen by comparison with FIG. 10. In FIG. 10 elements are not necessarily assumed to be software, and certain elements are considered (at least for purposes of example) as being hardware, such as hardware control 1008. Generally speaking, elements of a system for switching between sensors for optimal performance may include elements in hardware form, as software, or as some combination thereof; so long as the functions described may be carried out, the particular form of elements or the system overall is not otherwise limited.

Still with reference to FIG. 11, system 1100 includes sensors 1104A through 1104D. The sensors are not limited and may vary considerably. As shown in FIG. 11 the sensors 1104A through 1104D are hardware devices in communication with the processor 1102, though this is an example only. Also, where in FIG. 10 the sensors shown therein were specific sensors presented as illustrative examples, sensors 1104A through 1104D in FIG. 11 are referred to more generally. Thus, sensors 1104A through 1104D may include cameras or other imagers in a variety of wavelengths (e.g. thermal infrared, near infrared, visible, ultraviolet, backscatter x-ray, etc.) and properties (e.g. monochrome, RGB or other multi-channel, etc.), but may also include stereo imaging systems, depth imagers (such as time of flight cameras), ultrasonic sensors, motion detectors, imaging spectrometers, millimeter radar, and so forth.

Sensors 1104A through 1104D are adapted to provide primary data streams 1106A through 1106D respectively. As noted previously, it is not prohibited for one sensor to provide multiple primary data streams, or for multiple sensors to cooperatively provide a primary data stream, though for clarity each of sensors 1104A through 1104D in FIG. 11 provide one primary data stream 1106A through 1106D, so long as at least two primary data streams are provided. In practice, certain embodiments may have only a single sensor, if that sensor is adapted to provide two or more primary data streams. In addition, sensors not delivering primary data streams and/or providing data in addition to primary data streams also may be present, for example for providing environment property data, such as light meters, audio receivers, GPS receivers, etc. Such sensors are not shown in FIG. 11, but are not excluded from other embodiments.

Primary data streams 1106A through 1106D are communicated to sensor control entity 1108. Sensor control entity 1108 receives primary data streams 1106A through 1106D, and may provide control of and/or support to the sensors 1104A through 1104D, such as supporting drivers, coordinating resources (e.g. processor access), adjusting settings (e.g. for a camera focus, resolution, color bit depth, zoom, etc.), and so forth. It will be understood that sensor control entity 1108 may be to at least come degree analogous to the hardware control 1008 in FIG. 10. However, while the hardware control 1008 in FIG. 10 is described for simplicity as a hardware device, and in the arrangement of FIG. 11 a sensor control entity 1108 is shown as instantiated on the processor 1102, analogous elements may be present as hardware, as software, and/or as some combination thereof (or in some other form). Moreover, although the sensor control entity 1108 is shown as being separate from the sensors 1104A through 1104D and generic to all of the sensors 1104A through 1104D, a sensor control entity 1108 that is integrated with a sensor, or that is specific to a sensor (e.g. with each sensor having its own sensor control entity), also may be suitable. So long as the functions ascribed to sensor control entity 1108 may be carried out, the particulars of sensor control entity 1108 are not otherwise limited. This variability of form applies likewise to other elements herein, unless otherwise specified.

Primary data streams 1106 are communicated to an operating system entity 1110. While primary data streams 1106 are illustrated collectively as a single arrow for simplicity, in practice data streams may be communicated individually. Operating system entity 1110 typically controls processor 1102 and/or other features within system 1100 and/or in communication therewith on at least an overall level, for example controlling access to resources, providing a general user interface, supporting hardware, etc. Operating system entity 1110 is shown in FIG. 11 as executable instructions and/or data instantiated on processor 1102, though other arrangements may be suitable.

Typically, though not necessarily, operating system entity 1110 may communicate primary data streams 1106 with little or no alteration, rather acting as an intermediary between sensor control entity 1108 and data stream analysis entity 1112 (see below), for communication of data between two such potentially dissimilar and/or incompatible entities. However, it is not prohibited for an operating system entity 1110 to act on primary data streams 1106 in some fashion, whether simply buffering data for communication, recording data in a data store, communicating data to some external system, pre-processing primary data streams, adding metadata, etc.

Primary data streams 1106 are communicated from operating system entity 1110 to a data stream analysis entity 1112. Data stream analysis entity 1112 is adapted to perform certain functions related to optimizing data streams as described already herein. For example, data stream analysis entity 1112 may include therein data regarding data stream standards, executable instructions for comparing primary data streams against data stream standards and/or one another, executable instructions for selecting or synthesizing a secondary data stream from the primary data streams, etc. Thus data stream analysis entity 1112 is adapted to provide a secondary data stream 1114. Broadly speaking, those functions related to optimizing a secondary data stream 1114 from multiple primary data streams as described herein in more detail with regard to FIG. 3 through FIG. 9 (and also subsequent FIG. 14) may be performed and/or overseen by data stream analysis entity 1112.

Typically, though not necessarily, data stream analysis entity 1112 may be implemented as a software "layer" instantiated onto the same processor 1102 as operating system entity 1110, and interfacing therewith. Thus data stream analysis entity 1112 may in at least certain embodiments be instantiated as a "retrofit" on processor 1102 of an existing device, interfacing with existing operating system entity 1110 thereon and enabling advantages of data stream optimization as described herein.

As a more concrete example, an existing smart phone with an existing operating system, and with multiple sensors providing data, may accept thereon a data stream analysis entity even if the smart phone were not already designed or intended to perform data stream optimization as described herein. In such an instance the data stream analysis entity may be loaded onto the smart phone as a utility, an extension, etc., providing additional functionality to existing systems without necessarily requiring modification thereto.

Once data stream analysis entity 1112 has selected or synthesized a secondary data stream 1114 from primary data streams 1106 provided thereto, data stream analysis entity 1112 communicates secondary data stream 1114 to data stream recipients 1116A through 1116C for use by those data stream recipients 1118A through 1116C. As shown in FIG. 11 three data stream recipients 1116A through 1116C are shown, but more or fewer may be suitable in other embodiments. The nature of data stream recipients 1116A through 1116C also is not limited; various applications such as games, utilities, etc. that are interacted with directly by a user may serve as data stream recipients 1116A through 1116C, but other entities such as gesture recognition, face recognition, security, etc. that are transparent to a user also may serve as data stream recipients 1116A through 1116C. In addition, although sensor control entity 1108, operating system entity 1110, and data stream analysis entity 1112 are shown as distinct from data stream recipients 1116A through 1118C, any or all of sensor control entity 1108, operating system entity 1110, and data stream analysis entity 1112 may themselves also be data stream recipients 1116A through 1116C. For example, secondary data stream 1114 may be used for gesture input as a mechanism for controlling operating system entity 1110, such as by changing system settings, opening or closing other programs, and so forth. Likewise, although data stream recipients 1116A through 1116C are shown in FIG. 11 as data and/or executable instructions instantiated on processor 1102, hardware devices, including but not limited to sensors 1104A through 1104D that originate the primary data streams, also may be data stream recipients 1116A through 1116C. The nature and number of data stream recipients 1116A through 1116C is not limited, and may be extremely varied.

Moving on to FIG. 12, another example system 1200 for switching between sensors for optimal performance is shown in block diagram form. At least certain features of the arrangement in FIG. 12 may be seen as resembling FIG. 10 and/or FIG. 11, and detailed description thereof is not repeated.

The system 1200 in FIG. 12 includes a processor 1202, with a sensor control entity 1208, an operating system 1210, and a data stream analysis entity 1212 instantiated thereon. The system 1200 also includes sensors 1204A through 1204D in communication with the processor 1202, more particularly in communication with the sensor control entity 1208 and adapted to communicate primary data streams 1206A through 1206D therewith. The primary data streams collectively 1206 are also communicated from the sensor control entity 1208 to the operating system entity 1210, and from the operating system entity 1210 to the data stream analysis entity 1212.

However, as may be seen the communication paths between sensors 1204A through 1204D, sensor control entity 1208, operating system entity 1210, data stream analysis entity 1212 and elsewhere in FIG. 12 are shown as two-directional arrows, where analogous communication paths in FIG. 10 and FIG. 11 are shown as one-directional. Although typically key data may move from sensors "up the chain" in one direction, as shown in FIG. 12 communication may be two-way. Thus, just as sensor control entity 1208 may receive communication from sensors 1204A through 1204D, such as primary data streams 1206A through 1206D, sensor control entity 1208 also may send communication to sensors 1204A through 1204D. Examples of such communications may include changing settings of sensors, turning sensors on or off, or any other settings appropriate to the various technologies implemented in sensors 1204A through 1204D. Likewise, communication between other elements in FIG. 12 and similar embodiments may be two-way, or may be more complex, such as each element communicating with many elements in a network rather than simple one-way or two-way communication paths.

In addition, as may be seen in FIG. 12 data stream analysis entity 1212 provides three secondary data streams 1214A through 1214C, one to each of three input detectors 1216A through 1216C. More broadly, input detectors 1216A through 1216C represent specific examples of a wide variety of possible data stream recipients. Thus in FIG. 12, each input detector 1216A through 1216C receives a different (or potentially different) secondary data stream 1214A through 1214C. As has been noted previously herein, different purposes may have different needs for data, and thus different secondary data streams 1214A through 1214C may each be differently optimized for different data stream recipients. Consequently, in at least certain embodiments a data stream analysis entity 1212 may select and/or synthesize two or more secondary data streams 1214A through 1214C; one such secondary data stream may be optimized for gesture detection, another for face detection, etc.

Also in FIG. 12, input detectors 1216A through 1216C themselves are in communication with input executors 1220A through 1220C, communicating input 1218A through 1218C thereto. In the example arrangement of FIG. 12, data recipients such as input detectors 1216A through 1216C are not necessarily the end of the line. Rather, in the example as shown input detectors 1216A through 1216C each detect input present in an associated secondary data stream 1214A through 1214C, and then passes that input 1218A through 1218C to a corresponding input executor 1220A through 1220C. For example, each input detector 1216A through 1216C may detect a different type of input (e.g. gesture recognition, text recognition, face recognition, bar code/QR code recognition, etc.), and may then communicate that input 1218A through 1218C to input executors 1220A through 1220C.

Input executors 1220A through 1220C are adapted to execute some action in response to input 1218A through 1218C communicated thereto. For example, input executors 1220A through 1220C may include applications that respond to gestures by carrying out commands within those applications in response to gestures that have been detected, an operating system that similarly responds to gestures by carrying out commands, a utility that responds to QR code input by translating the input or forwarding to a web site, etc. Thus, through system 1200, control over system 1200 itself, or over some other system, may be enabled at least in part through optimizing data streams as shown and described herein (e.g. by detecting input in optimized data streams and acting on such input).

Although FIG. 12 refers to call-outs 1216A through 1216C as input detectors, 1218A through 1218C as input, and 1220A through 1220C as input executors, it is emphasized that addressing input is an example only, and other arrangements may be suitable. That is, different data stream recipients other than or in addition to input detectors 1216A through 1216C may be present, and may perform functions other than detecting input and passing along input 1218A through 1218C. Likewise, communications from data stream recipients may be other than input 1218A through 1218C. Similarly, entities receiving and/or acting on such communications from data stream recipients (if present) also may be other than input executors 1220A through 1220C. The particular nature or type of data stream recipients is not limited, nor communication by data stream recipients, nor any targets of such communication. Addressing input, communicating that input, and executing that input as shown in FIG. 12 is presented as an example, and is not limiting.

Turning to FIG. 13, another example system 1300 for switching between sensors for optimal performance is shown, in block diagram form. System 1300 includes a processor 1302, with a sensor control entity 1308, an operating system 1310, and a data stream analysis entity 1312 instantiated thereon. System 1300 also includes sensors 1304A through 1304D in communication with the processor 1302, more particularly in communication with the sensor control entity 1308 and adapted to communicate primary data streams 1306A through 1306D therewith. The primary data streams, collectively 1306, are also communicated from the sensor control entity 1308 to the operating system entity 1310, and from the operating system entity 1310 to the data stream analysis entity 1312.

Also in FIG. 13, a single data stream recipient 1316 is in communication with the data stream analysis entity 1312, and receives an optimized secondary data stream 1314. Data stream recipient 1316 in turn communicates tertiary data 1318A and 1318B with tertiary recipients 1320A through 1320C. Tertiary data 1318A and 1318B may be analogous with input 1218A through 1218C in FIG. 12, and tertiary recipients 1320A through 1320C may be analogous with input executors 1220A through 1220C in FIG. 12. However, as noted with regard to FIG. 12, embodiments are not limited only to detecting, communicating, and executing input, and a more general arrangement thus is shown in FIG. 13 to illustrate this.

In addition, the arrangement in FIG. 13 includes only one data stream recipient 1316, despite there being two tertiary data 1318A and 1318B, and three tertiary recipients 1320A through 1320C. As noted previously herein, various arrangements and numbers of data/data streams and entities communicating such may be suitable, and the numbers and arrangements thereof shown are examples only. FIG. 13 shows an arrangement wherein a single data stream recipient 1316 produces two tertiary data 1318A and 1318B, which in turn are communicated to three tertiary recipients 1320A through 1320C.

As a more concrete example, data stream recipient 1316 might represent a gesture input detector receiving an optimized secondary data stream 1314 from data stream analysis entity 1312 on processor 1302, detecting two different types or classes of gesture input, and conveying the two different inputs types as tertiary data 1318A and 1318B, respectively. For instance, certain gestures may be accepted only by certain applications, or may mean different things for different applications; thus the same secondary data stream 1314 processed by a gesture input detector could yield two different sets of inputs. Continuing on, tertiary recipients 1320B and 1320C could be two applications that receive a common input of tertiary data 1318B, while another tertiary recipient 1320A is an application that requires and receives a different input of tertiary data 1318A, with each application acting on that input according to the application's design.

The particular arrangements for systems shown in FIG. 10 through FIG. 13 are examples only, and that many variations may be suitable. In addition, functions or elements shown separately for clarity may be combined, e.g. a data stream analysis entity may be integrated with an operating system; likewise functions or elements may be subdivided, rearranged, etc., so long as the functions specified herein may be carried out.

Figure 14:
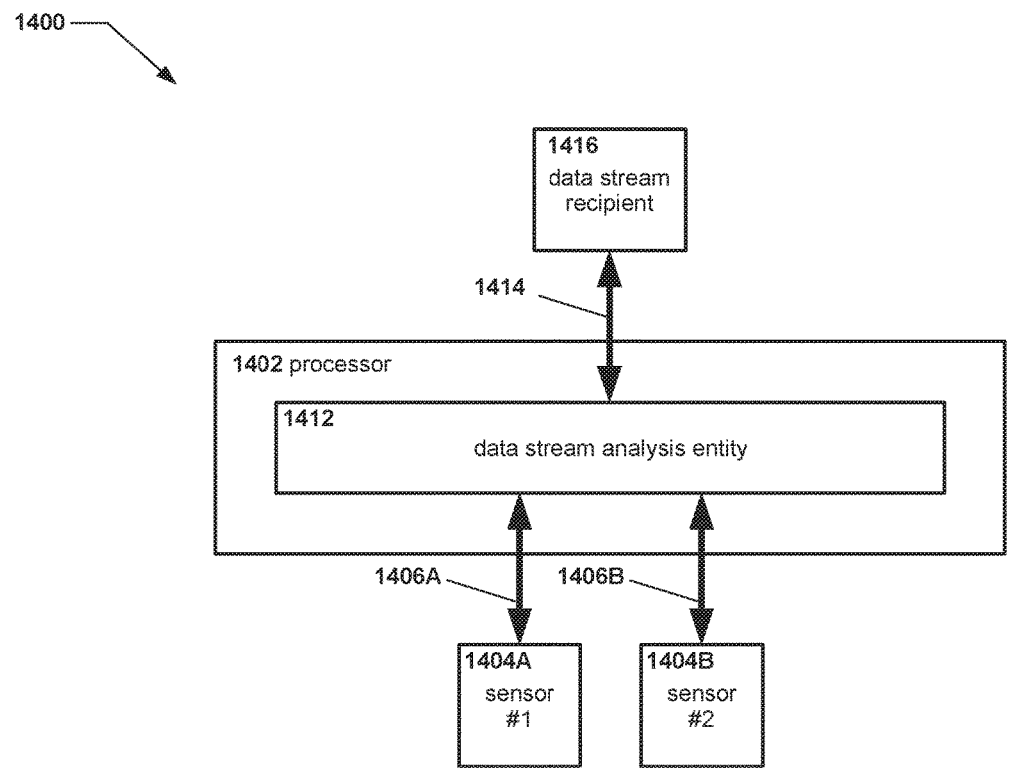
FIG. 14 shows a simplified example system for switching between sensors for optimal performance, in block diagram form.

Turning to FIG. 14, another example system 1400 for switching between sensors for optimal performance is shown in block diagram form. System 1400 includes a processor 1402, with a data stream analysis entity 1412 instantiated thereon. System 1400 also includes sensors 1404A and 1404B in communication with processor 1402, more particularly in communication with data stream analysis entity 1412 and adapted to communicate primary data streams 1406A and 1406B therewith. A data stream recipient 1416 is in communication with the data stream analysis entity 1412, communicating a secondary data stream 1414 thereto. Secondary data stream 1414 will have been selected/synthesized from among the primary data streams 1406A and 1406B by the data stream analysis entity 1412.

As may be understood through comparison of FIG. 14 with any of FIG. 10 through FIG. 13, system 1400 in FIG. 14 may be considered a "bare bones" embodiment. That is, no separate sensor controller is present, and either no operating system is present or at least is not directly involved in carrying out the functions of the system 1400. Such an embodiment may be suitable for at least certain applications; as noted an operating system may function in certain embodiments as an intermediary for communicating data from one entity to another, and a sensor controller likewise. Thus it may be possible and/or desirable in certain embodiments to dispense with a sensor controller, operating system, etc., or at least to leave such elements "out of the loop" if no additional functionality is provided by a sensor controller or operating system in a particular embodiment.

However, it is noted that although certain embodiments may so exclude a sensor controller, operating system, etc., excluding such elements is not required, and the presence of such elements may in itself be useful. For example, certain existing devices may already include a sensor controller, have an operating system, etc., and embodiments wherein a data stream analysis entity is an add-on to existing systems may be useful, such as by providing additional functionality in terms of optimal data streams to legacy devices that may already be in use. Thus, in at least certain instances a system for providing optimal data streams may be established by instantiating a data stream analysis entity onto an already-existing device such as a smart phone, head mounted display, PC, etc.

Still with reference to FIG. 14, as may be seen the data stream recipient 1416 is not shown as instantiated on the processor 1402, but rather as a separate element. As previously noted, any element may be hardware, software, a combination of hardware and software, or some other configuration, so long as the functions as described herein may be performed. Thus, as an example the data stream recipient 1416 may be considered as a hardware device, though the data stream recipient 1416 could just as readily be executable instructions and/or data instantiated on the processor 1402. Likewise, the data stream analysis entity 1412 could be hardware rather than being instantiated on the processor as shown, and the sensors 1404A and 1404B could instead be executable instructions and/or data on a processor 1402 that generates a data stream rather than hardware, etc.

Figure 15:
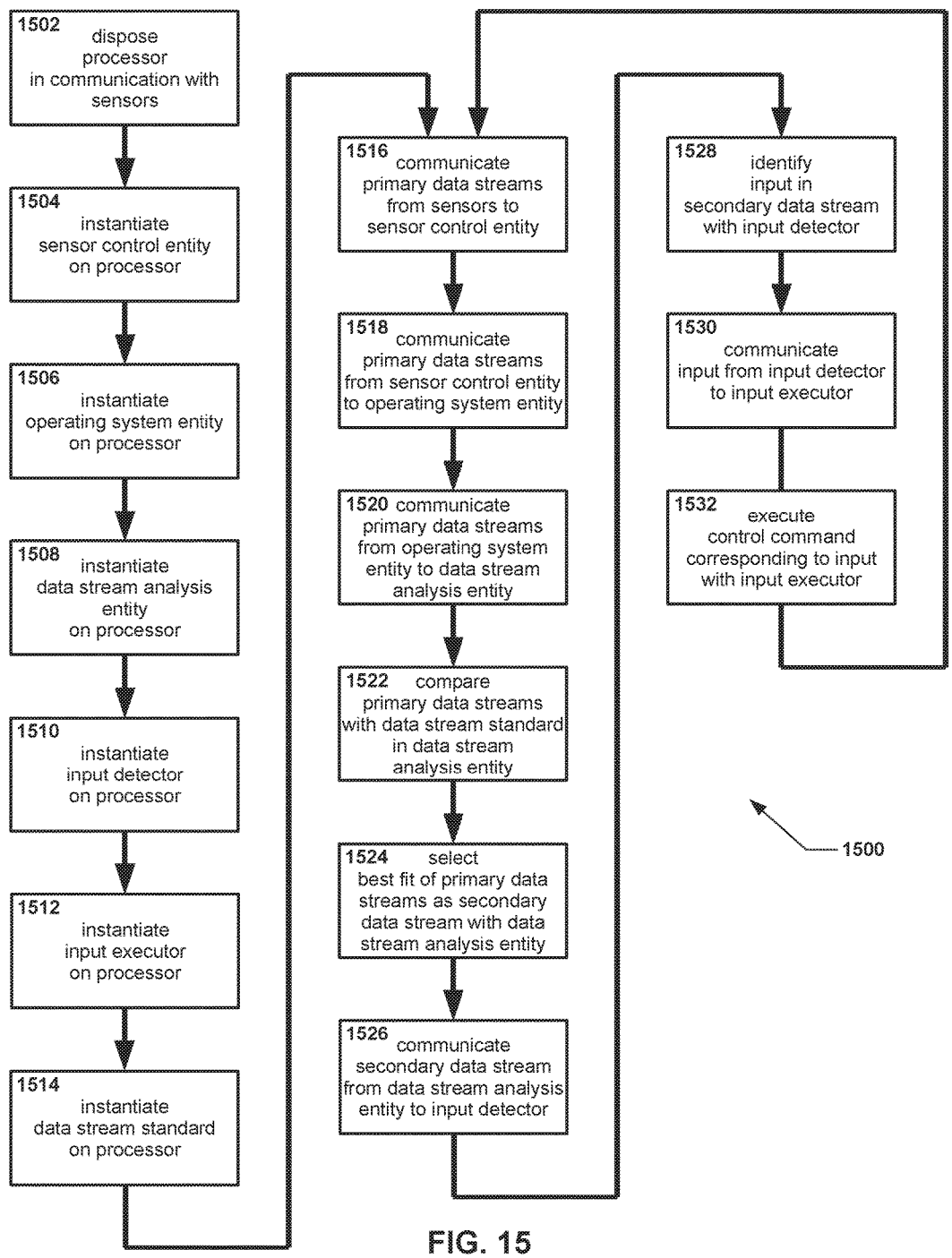
FIG. 15 shows another example method for switching between sensors for optimal performance, with regard to example implementation using a system similar to FIG. 10 through FIG. 14, in flow chart form.

Now with reference to FIG. 15, and also with regard to FIG. 10 through FIG. 14, an example method 1500 is shown for switching between sensors for optimal performance, as may be implemented particularly with systems similar to those shown and described in FIG. 10 through FIG. 14. Although it is emphasized that methods as shown and described herein are not limited only to implementation on such systems, it may be illuminating to show such a specific example method 1500 particularly suited for such systems.

In the arrangement of FIG. 15, certain steps already described are not again described in detail. Likewise references to steps carrying out certain features/functions are not described in detail, where those features/functions themselves have been described previously herein.

In method 1500, a processor is disposed in step 1502 in communication with two or more sensors.

A sensor control entity is instantiated in step 1504 on the processor, an operating system entity is instantiated in step 1506 on the processor, and a data stream analysis entity is instantiated in step 1508 on the processor. Sensor control entities, operating system entities, and data stream analysis entities and functions thereof have been described previously herein.

An input detector is instantiated on the processor in step 1510. As previously noted, an input detector may be understood as an example of a data stream recipient. An input executor also is instantiated on the processor in step 1512. An input executor likewise may be understood as an example of a tertiary recipient.

A data stream standard is instantiated in step 1514 on the processor. Primary data streams are communicated in step 1516 from the sensors to the sensor control entity.

The primary data streams are communicated in step 1518 from the sensor control entity to the operating system entity, and are communicated in step 1520 from the operating system entity to the data stream analysis entity. Operating system entities and data stream analysis entities and functions thereof have been described previously herein.

The primary data streams are compared in step 1522 with the data stream standard within the data stream analysis entity, and a best fit of the primary data streams is selected in step 1524 as a secondary data stream with the data stream analysis entity. The secondary data stream is then communicated in step 1526 from the data stream analysis entity to the input detector. In step 1528 the input detector identifies input in the secondary data stream, and communicates that input to an input executor in step 1530. The input executor then executes in step 1532 a control command corresponding to the input.

As may be seen in FIG. 15, following step 1532 method 1500 loops back to step 1516. Thus, method 1500 may be iterative and ongoing: primary data streams are communicated in step 1516 from the sensors in an ongoing manner, and result in the input executor executing in step 1532 control commands in an ongoing manner. In addition, it is pointed out that step 1524 of selecting a secondary data stream also is ongoing in such case. Thus, over time different secondary data streams may be selected from among the primary data streams, for example as conditions change relative to the data stream standard. In different iterations through the loop as shown in FIG. 15, different primary data streams may be selected in step 1524 for use as secondary data streams; the primary data stream selected in one iteration may be different from the primary data stream selected in a second iteration.

In summary, as circumstances change, method 1500 may select first one sensor feed as optimized, then another, and another, depending on which of the various sensor feeds are well suited in the circumstances that prevail at a given time. For example, an RGB camera feed may be selected as an optimized data stream while a system is outdoors in bright light, but method 1500 may select a NIR camera feed as optimized if the system is moved indoors into dimmer light, as night falls, etc.

Although FIG. 15 shows certain example features, such as selecting a primary data stream in step 1524 as the secondary data stream, other arrangements including but not limited to those described and shown elsewhere herein may be suitable. Thus embodiments similar to FIG. 15 but wherein a secondary data stream is synthesized rather than selected, or where other variations exist, also may be suitable.

With regard again to the loop/update shown in FIG. 15, such updating may be understood as potentially useful for devices that are mobile, for example smart phones, head mounted displays, drones, vehicles, etc., as those mobile devices move or are moved from one place with one set of conditions to another place with another set of conditions. However, even substantially stationary devices, such as desktop PCs, game consoles, servers, etc. may in at least some instances benefit therefrom. For example, lighting in rooms may vary with time of day, whether lights are on and how many, etc. Different sensors may provide data of differing quality depending on many other factors including but not limited to distance to targets of interest, rate of motion within the field of view, "busyness" in the field of view (e.g. how many potential targets are present at a time), etc. Thus, circumstances also may vary for stationary systems, and adaptability by selecting among different data streams also may be useful.

While such ongoing updates as shown in method 1500 may not be necessary for all embodiments, ongoing updates may be suitable for at least certain embodiments.

Figure 16:
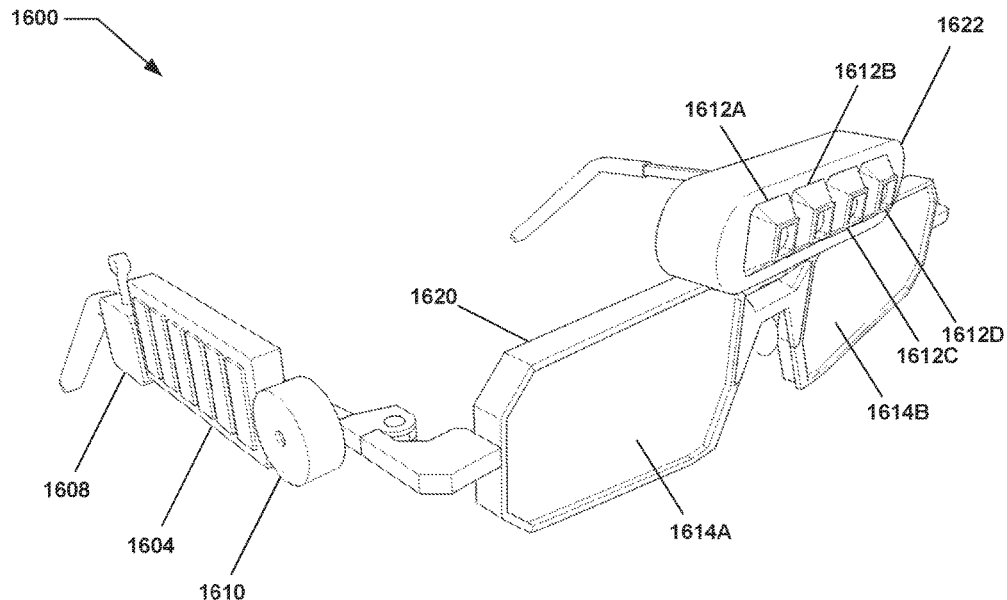
FIG. 16 shows an example hardware device for switching between sensors for optimal performance, in the form of a head mounted display, in perspective view.

Turning attention to FIG. 16, an example of a particular hardware device 1600 that enables switching between sensors for optimal performance is demonstrated. Hardware device 1600 includes a body 1620 and a sensor array 1622. Body 1620 encloses a processing unit 1604 and a storage device 1610, as described above for example with respect to FIG. 1 and FIG. 2, such that the storage device 1610 may be in data communication with processing unit 1604 and include instructions executable by the processing unit 1604 so as to implement functions and/or methods for switching between sensors for optimal performance as previously described and shown. Sensor array 1622 includes various visual sensors 1612A through 1612D as disclosed previously herein, which may include but are not limited to RGB, IR, UV, and 3D visual sensors. More particular examples of such sensors may include 3D detection sensors such as Intel RealSense, Occipital Structure Sensor, Microsoft XBOX Kinect sensors, etc. Such sensor packages may include a visual RGB sensor, IR depth sensors, and sometimes thermal sensors, such as those provided by FLIR. In addition, useful embodiments may employ other than visual sensors: embodiments may be implemented with non-imaging and/or non-visual sensors, such as sound, air pressure, chemical, RF, ionizing radiation, or other similar technologies. So long as sensors for a particular sensed medium exist, with a range of possible sensors and/or sensor settings/configurations varying in capabilities, it is necessary or desirable to provide an output from a collection of different sensors that is optimized for specific types of analysis, embodiments are not limited with regard thereto.

Still with reference to FIG. 16, hardware device 1600 shown therein also includes certain other features referred to previously herein. A communication device in the form of a radio receiver 1608 is shown, so as to enable communication from hardware device 1600 to other devices, systems, etc. In addition, hardware device 1600 as shown includes displays 1614A and 1614B, disposed on body 1620, so as to provide graphical output to a user as a possible function, such as stereo graphical output through the use of two such displays 1614A and 1614B. Such additional features, while not necessarily required for all embodiments, may be useful and are not prohibited.

It is noted that body 1620 shown for the example hardware device 1600 is illustrated with a form similar to a pair of glasses or a headset, and adapted to be worn in a similar fashion. Thus, hardware device 1600 may be considered to be a head mounted display, although other arrangements, including but not limited to smart phones, tablets, desktop or laptop PCs, game consoles, drones, vehicles, etc. may be equally suitable.

Further, body 1620 as shown is configured with sensors 1612A through 1612D positioned thereon such that when body 1620 is worn by a user, sensors 1612A through 1612D would be substantially aligned with the lines of sight of the user' eyes, and could potentially encompass fields of view at least somewhat comparable to those of the user's eyes, assuming sensors 1612A through 1612D exhibit fields of view similar in extent to those of the user. Similarly, in the arrangement shown body 1620 is configured and displays 1614A and 1614B disposed thereon such that when body 1620 is worn by a user, displays 1614A and 1614B would be proximate to and substantially in front of the viewer's eyes. Such a stereo configuration could enable stereo 3D graphical output to the user. However, these arrangements are examples only.

Figure 17:
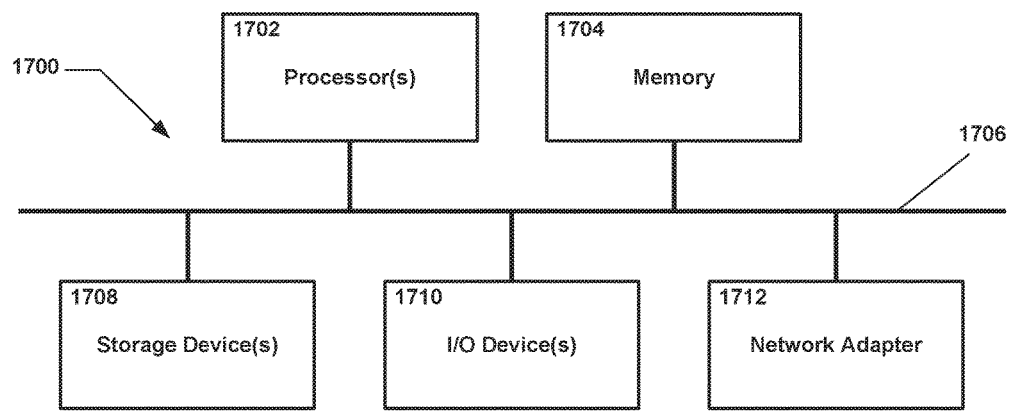
FIG. 17 shows a block diagram of a processing system that may implement certain example operations as described.

Moving on to FIG. 17, therein is shown a block diagram of an apparatus that may perform various operations, and store various information generated and/or used by such operations, according to an embodiment of the disclosed technique. The apparatus may represent any computer or processing system described herein. Processing system 1700 is a hardware device on which any of the other entities, components, or services depicted in the examples of FIG. 1 through FIG. 16 (and any other components described in this specification) may be implemented. Processing system 1700 includes one or more processors 1702 and memory 1704 coupled to an interconnect 1706. Interconnect 1706 is shown in FIG. 17 as an abstraction that represents any one or more separate physical buses, point to point connections, or both connected by appropriate bridges, adapters, or controllers. Interconnect 1706, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

Processor(s) 1702 is/are the central processing unit of the processing system 1700 and control the overall operation of processing system 1700. In some embodiments, processor(s)

1702 accomplish this by executing software or firmware stored in memory 1704. Processor(s) 1702 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices. A reader skilled in the relevant art will recognize that the term "processor" used throughout the foregoing is more analogous to processing system 1700 rather than processor 1702, which forms only one component of the "processor" disclosed in the various methods and systems described in FIGS. 1 through 15.

Memory 1704 is or includes the main memory of processing system 1702. Memory 1704 represents any form of random access memory (RAM), read-only memory (ROM), flash memory, or the like, or a combination of such devices. In use, memory 1704 may contain a code. In some embodiments, the code includes a general programming module configured to recognize the general-purpose program received via the computer bus interface, and prepare the general-purpose program for execution at the processor. In other embodiments, the general programming module may be implemented using hardware circuitry such as ASICs, PLDs, or field-programmable gate arrays (FPGAs).

A network adapter 1712, a storage device(s) 1708, and I/O device(s) 1710, are also connected to processor(s) 1702 through interconnect 1706. Network adapter 1706 provides processing system 1700 with the ability to communicate with remote devices over a network and may be, for example, an Ethernet adapter or Fibre Channel adapter. Alternatively or in addition, network adapter 1706 can implement a wireless interface for communication with a corresponding wireless transceiver. Wireless protocols could include well-known standards such as WiFi, Bluetooth, NFC, any of the variety of cellular data communications protocols currently in use by commercial wireless providers, or any other similar wireless data communications technologies now known or later developed. Network adapter 1706 may also provide the processing system 1700 with the ability to communicate with other computers within the cluster. In some embodiments, processing system 1700 may use more than one network adapter to deal with the communications within and outside of the cluster separately.

I/O device(s) 1710 can include, for example, a keyboard, a mouse or other pointing device, disk drives, printers, a scanner, and other input and/or output devices, including a display device. I/O device(s) 1710 also may include, for example, cameras and/or other imagers adapted to accept visual input including but not limited to postures and/or gestures. The display device may include, for example, a cathode ray tube (CRT), liquid crystal display (LCD), or some other applicable known or convenient display device. The display device may take various forms, including but not limited to stereo displays suited for use in near-eye applications such as head mounted displays or other wearable devices.

The code stored in memory 1704 may be implemented as software and/or firmware to program processor(s) 1702 to carry out actions described herein. In certain embodiments, such software or firmware may be initially provided to processing system 1700 by downloading from a remote system through processing system 1700, such as via network adapter 1712.

The techniques herein may be implemented by, for example, programmable circuitry such as one or more microprocessors programmed with software and/or firmware, or entirely in special-purpose hardwired, non-programmable circuitry, or in a combination of such forms. Special-purpose hardwired circuitry may be in the form of, for example, one or more AISCs, PLDs, FPGAs, etc.

Software or firmware for use in implementing the techniques introduced here may be stored on a machine-readable storage medium and may be executed by one or more general-purpose or special-purpose programmable microprocessors. A "machine-readable storage medium", as the term is used herein, includes any mechanism that can store information in a form accessible by a machine.

A machine can also be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch, or bridge, or any machine capable of executing a set of instructions (sequential or otherwise) that specify actions to be taken by that machine.

A machine-accessible storage medium or a storage device(s) 1708 includes, for example, recordable/non-recordable media (e.g., ROM; RAM; magnetic disk storage media; optical storage media; flash memory devices; etc.), etc., or any combination thereof. The storage medium typically may be non-transitory or include a non-transitory device. In this context, a non-transitory storage medium may include a device that is tangible, meaning that the device has a concrete physical form, although the device may change its physical state. Thus, for example, non-transitory refers to a device remaining tangible despite this change in state.

The term "logic", as used herein, may include, for example, programmable circuitry programmed with specific software and/or firmware, special-purpose hardwired circuitry, or a combination thereof.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and nonobvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and nonobvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The above specification, examples, and data provide a complete description of the manufacture and use of the composition of the invention. Since many embodiments of the invention can be made without departing from the spirit and scope of the invention, the invention resides in the claims hereinafter appended.

I claim:

1. A method, comprising:
commutatively coupling a processing device in communication with a first sensor and a second sensor, the first sensor being adapted to provide a first primary data stream and the second sensor being adapted to provide a second primary data stream;
instantiating a sensor controller on the processing device;
instantiating an operating system on the processing device;
instantiating a data stream analyzer on the processing device, the data stream analyzer comprising a data stream standard;
instantiating an input detector on the processing device;
instantiating an input executor on the processing device;
instantiating the data stream standard on the processing device;
communicating the first primary data stream from the first sensor and the second primary data stream from the second sensor to the sensor controller;
communicating the first primary data stream and the second primary data stream from the sensor controller to the operating system;
communicating the first primary data stream and the second primary data stream from the operating system to the data stream analyzer;
determining, by the data stream analyzer, a first quality value for the first primary data stream by comparing the first primary data stream to a factor of the data stream standard;
determining, by the data stream analyzer, a second quality value for the second primary data stream by comparing the second primary data stream to the factor of the data stream standard;
combining the first primary data stream with the second primary data stream to synthesize a secondary data stream;
determining, by the data stream analyzer, a third quality value for the secondary data stream by comparing the secondary data stream to the factor of the data stream standard, wherein the first quality value, the second quality value, and the third quality value are values defined by a value rating scale;
in response to the third quality value being greater than the first quality value and the second quality value, communicating the secondary data stream from the data stream analyzer to the input detector;
detecting with the input detector an input in the secondary data stream; and
communicating the input from the input detector to the input executor.

2. A method, comprising:
commutatively coupling a processing device in communication with a first sensor and a second sensor, the first sensor being adapted to provide a first primary data stream and the second sensor being adapted to provide a second primary data stream;
commutatively coupling the processing device with a data stream recipient;
establishing, by the processing device, a data stream standard;
communicating, to the processing device, the first primary data stream and the second primary data stream;
determining, by the processing device, a first quality value for the first primary data stream by comparing the first primary data stream to a factor of the data stream standard;
determining, by the processing device, a second quality value for the second primary data stream by comparing the second primary data stream to the factor of the data stream standard;
combining, by the processing device, the first primary data stream with the second primary data stream to synthesize a secondary data stream;
determining, by the processing device, a third quality value for the secondary data stream by comparing the secondary data stream to the factor of the data stream standard, wherein the first quality value, the second quality value, and the third quality value are values defined by a value rating scale; and
in response to the third quality value being greater than the first quality value and the second quality value, communicating the secondary data stream from the processing device to the data stream recipient.

3. The method of claim 2, comprising:
iteratively comparing the first primary data stream and the second primary data stream against the data stream standard with the processing device; and
iteratively selecting the secondary data stream that more closely matches the data stream standard from among the first primary data stream or the second primary data stream.

4. The method of claim 2, wherein the data stream standard is specific to the data stream recipient.

5. The method of claim 2, wherein the data stream standard is specific to a task for the data stream recipient.

6. The method of claim 2, wherein the data stream standard comprises an environment factor.

7. The method of claim 6, wherein the environment factor comprises at least one of a minimum light level, a maximum light level, a maximum infrared light level, or a maximum ultraviolet light level.

8. The method of claim 2, wherein the data stream standard comprises a content factor.

9. The method of claim 8, wherein the content factor comprises at least one of a minimum dynamic range, a maximum noise, a minimum input level, or a maximum input level.

10. The method of claim 2, wherein the data stream standard comprises a function factor.

11. The method of claim 10, wherein the function factor comprises at least one of an input detection, an input confidence, an input step detection, or an input step confidence.

12. The method of claim 2, wherein the first sensor or the second sensor comprises at least one of an RGB image sensor, a grayscale image sensor, a NIR image sensor, a TIR image sensor, a NIR time-of-flight depth sensor, an RGB stereo sensor, a grayscale stereo sensor, a NIR stereo sensor, or an ultrasonic depth sensor.

13. The method of claim 2, wherein:
comparing the first primary data stream and the second primary data stream comprises assigning a quality value to the first primary data stream and the second primary data stream, respectively, with respect to the data stream standard; and
selecting the secondary data stream comprises selecting one of the first primary data stream or the second primary data stream that exhibits a highest quality value.

14. The method of claim 13, wherein the quality value is at least two dimensional.

15. A method, comprising:
commutatively coupling a processing device with a first sensor and a second sensor, the first sensor being adapted to provide a first primary data stream and the second sensor being adapted to provide a second primary data stream;
commutatively coupling the processing device with a data stream recipient;
establishing, by the processing device, a data stream standard;
receiving, from the first sensor, the first primary data stream;
receiving, from the second sensor, the second primary data stream;
determining, by the processing device, a first quality value for the first primary data stream by comparing the first primary data stream to a factor of the data stream standard;
determining, by the processing device, a second quality value for the second primary data stream by comparing the second primary data stream to the factor of the data stream standard;
combining, by the processing device, the first primary data stream and the second primary data stream to synthesize a secondary data stream
determining, by the processing device, a third quality value for the secondary data stream by comparing the secondary data stream to the factor of the data stream standard, wherein the first quality value, the second quality value, and the third quality value are values defined by a value rating scale; and
in response to the third quality value being greater than the first quality value and the second quality value, communicating, to the data stream recipient, the secondary data stream.

16. An apparatus, comprising:
a processing device;
a first sensor and a second sensor in communication with the processing device, the first sensor being adapted to provide a first primary data stream and the second sensor being adapted to provide a second primary data stream;
a sensor controller instantiated on the processing device, the sensor controller being adapted to control the first sensor and the second sensor, wherein the sensor controller is adapted to receive the first primary data stream and the second primary data stream;
an operating system instantiated on the processing device, the operating system being adapted to receive the first primary data stream and the second primary data stream from the sensor controller;
a data stream analyzer instantiated on the processing device, the data stream analyzer adapted to:
receive the first primary data stream and the second primary data stream from the operating system;
establish a data stream standard;
determine a first quality value for the first primary data stream by comparing the first primary data stream to a factor of the data stream standard;
determine a second quality value for the second primary data stream by comparing the second primary data stream to the factor of the data stream standard;
combine the first primary data stream with the second primary data stream to synthesize a secondary data stream;
determine a third quality value for the secondary data stream by comparing the secondary data stream to the factor of the data stream standard, wherein the first quality value, the second quality value, and the third quality value are values defined by a value rating scale;
in response to the third quality value being greater than the first quality value and the second quality value, an input detector instantiated on the processing device, the input detector being adapted to:
receive the secondary data stream from the data stream analyzer; and
to identify an input in the secondary data stream; and
an input executor instantiated on the processing device, the input executor being adapted to:
receive the input from the input detector; and
execute a control command corresponding with the input.

17. An apparatus, comprising:
a processing device;
a first sensor and a second sensor in communication with the processing device, the first sensor being adapted to provide a first primary data stream and the second sensor being adapted to provide a second primary data stream;
a data stream analyzer instantiated on the processing device, the data stream analyzer being adapted to:
receive the first primary data stream from the first sensor;
receive the second primary data stream from the second sensor;
establishing a data stream standard;
determine a first quality value for the first primary data stream by comparing the first primary data stream to a factor of the data stream standard;
determine a second quality value for the second primary data stream by comparing the second primary data stream to the factor of the data stream standard;
combine the first primary data stream with the second primary data stream to synthesize a secondary data stream; and
determine a third quality value for the secondary data stream by comparing the secondary data stream to the factor of the data stream standard, wherein the first quality value, the second quality value, and the third quality value are values defined by a value rating scale; and
a data stream recipient in communication with the processing device, the data stream recipient being adapted to receive the secondary data stream from the data stream analyzer in response to the third quality value being greater than the first quality value and the second quality value.

18. The apparatus of claim 17, wherein: the data stream standard comprises at least one of an environment factor, a content factor, or a function factor.

19. The apparatus of claim 17, wherein the first sensor or the second sensor comprises at least one of an RGB image sensor, a grayscale image sensor, a NIR image sensor, a TIR image sensor, a NIR time-of-flight depth sensor, an RGB stereo sensor, a grayscale stereo sensor, a NIR stereo sensor, or an ultrasonic depth sensor.

20. The apparatus of claim 17, wherein: the data stream recipient comprises a gesture input detector adapted to identify an input in the secondary data stream.

21. The apparatus of claim 20, further comprising: an input executor adapted to receive the input from the gesture input detector and to execute a control command corresponding with the input.

22. An apparatus, comprising:
a processing device;
a first sensor and a second sensor in communication with the processing device, the first sensor being adapted to provide a first primary data stream and the second sensor being adapted to provide a second primary data stream;
a data stream analyzer instantiated on the processing device, the data stream analyzer being adapted to:
  receive the first primary data stream and the second primary data stream;
  store or generate a data stream standard;
  determine a first quality value for the first primary data stream by comparing the first primary data stream to a factor of the data stream standard;
  determine a second quality value for the second primary data stream by comparing the second primary data stream to the factor of the data stream standard;
  combine the first primary data stream with the second primary data stream to synthesize a secondary data stream; and
  determine a third quality value for the secondary data stream by comparing the secondary data stream to the factor of the data stream standard, wherein the first quality value, the second quality value, and the third quality value are values defined by a value rating scale; and
a data stream recipient in communication with the processing device, the data stream recipient being adapted to receive the secondary data stream from the data stream analyzer in response to the third quality value being greater than the first quality value and the second quality value.

* * * * *